(12) United States Patent
Young et al.

(10) Patent No.: US 8,672,786 B2
(45) Date of Patent: Mar. 18, 2014

(54) INVERTED TOOTH CHAIN AND SPROCKET DRIVE SYSTEM WITH REDUCED MESHING IMPACT

(75) Inventors: James D. Young, Chesaning, MI (US); Darren J. Stewart, Howell, MI (US)

(73) Assignee: Cloyes Gear and Products, Inc., Fort Smith, AR (US)

( * ) Notice: Subject to any disclaimer, the term of this patent is extended or adjusted under 35 U.S.C. 154(b) by 386 days.

(21) Appl. No.: 13/043,932

(22) Filed: Mar. 9, 2011

(65) Prior Publication Data

US 2011/0183799 A1    Jul. 28, 2011

Related U.S. Application Data

(63) Continuation-in-part of application No. 12/814,963, filed on Jun. 14, 2010, which is a continuation-in-part of application No. 12/556,332, filed on Sep. 9, 2009.

(60) Provisional application No. 61/095,393, filed on Sep. 9, 2008.

(51) Int. Cl.
*F16H 7/06* (2006.01)
*F16G 13/02* (2006.01)

(52) U.S. Cl.
USPC ........................................................ 474/206

(58) Field of Classification Search
USPC .............. 474/5, 148, 152, 157, 212, 213, 215
See application file for complete search history.

(56) References Cited

U.S. PATENT DOCUMENTS

| 1,598,906 A | 9/1926 | Dull |
| 1,693,431 A | 11/1928 | Behning |

(Continued)

FOREIGN PATENT DOCUMENTS

| CN | 2651514 Y | 10/2004 |
| CN | 2771564 Y | 4/2006 |

(Continued)

OTHER PUBLICATIONS

International Search Report mailed Dec. 4, 2009 for International application No. PCT/US2009/056364.

(Continued)

*Primary Examiner* — William E Dondero
*Assistant Examiner* — Robert T Reese
(74) *Attorney, Agent, or Firm* — Fay Sharpe LLP

(57) ABSTRACT

An inverted tooth chain and sprocket drive system in which the initial contact distance $IC_D$, the meshing impact angle Sigma ($\sigma$), the link plate entrance angle Beta ($\beta$), and other aspects of the meshing geometry are controlled and optimized to reduce noise and vibration by using a particular chain link plate form and, in preferred cases, by modifying the sprocket tooth pressure angle. The system can include first and second sprockets for which the pressure angle can be controlled to ensure that the desired values for the initial contact distance $IC_D$, the meshing impact angle Sigma ($\sigma$), and the link plate entrance angle Beta ($\beta$) are equal for both sprockets even though the sprockets have different tooth counts. For a chain pitch P in the range of 6.35 mm to 7.7 mm, the initial contact distance $IC_D$ is controlled such that $0.49 P \leq IC_D \leq 0.53 P$, the meshing impact angle Sigma ($\sigma$) is controlled such that $\sigma \leq 34°$, and the link plate entrance angle Beta ($\beta$) is controlled such that $\beta \leq 9°$. For certain alternative chain and/or sprocket configurations, $\sigma \leq 33°$ and $\beta \leq 9°$, or $\sigma \leq 31°$ and $\beta \leq 7°$.

18 Claims, 24 Drawing Sheets

(56) References Cited

U.S. PATENT DOCUMENTS

| | | | |
|---|---|---|---|
| 3,377,875 A | 4/1968 | Sand | |
| 3,495,468 A | 2/1970 | Griffel | |
| 3,535,871 A | 10/1970 | Jeffrey | |
| 3,636,788 A | 1/1972 | Jeffrey | |
| 4,168,634 A | 9/1979 | Griffel | |
| 4,509,323 A | 4/1985 | Ledvina et al. | |
| 4,509,937 A | 4/1985 | Ledvina et al. | |
| 4,758,209 A | 7/1988 | Ledvina | |
| 4,758,210 A | 7/1988 | Ledvina | |
| 4,759,740 A | 7/1988 | Cradduck | |
| 4,764,158 A | 8/1988 | Honda et al. | |
| 4,832,668 A | 5/1989 | Ledvina et al. | |
| 4,906,224 A | 3/1990 | Reber | |
| 4,915,675 A | 4/1990 | Avramidis | |
| 4,915,676 A | 4/1990 | Komeya | |
| 5,154,674 A | 10/1992 | Avramidis et al. | |
| 5,236,400 A | 8/1993 | Tsuyama | |
| 5,267,910 A | 12/1993 | Maruyama et al. | |
| 5,419,743 A | 5/1995 | Takeda et al. | |
| 5,453,059 A | 9/1995 | Avramidis et al. | |
| 5,464,374 A | 11/1995 | Mott | |
| 5,628,702 A | 5/1997 | Kotera | |
| 5,758,484 A | 6/1998 | Ledvina et al. | |
| 5,803,854 A | 9/1998 | Tada et al. | |
| 6,077,181 A | 6/2000 | Kanehira et al. | |
| 6,112,510 A | 9/2000 | Ichikawa et al. | |
| 6,155,944 A | 12/2000 | Matsuda | |
| 6,155,945 A | 12/2000 | Matsuda | |
| 6,159,122 A | 12/2000 | Kanehira et al. | |
| 6,168,543 B1 | 1/2001 | Matsuda | |
| 6,186,920 B1 | 2/2001 | Reber | |
| 6,244,983 B1 | 6/2001 | Matsuda | |
| 6,272,835 B1 | 8/2001 | Horie et al. | |
| 6,325,735 B1 | 12/2001 | Kanehira et al. | |
| 6,334,828 B1 | 1/2002 | Suzuki | |
| 6,413,180 B1 | 7/2002 | Kanehira et al. | |
| 6,416,436 B1 | 7/2002 | Kanehira et al. | |
| 6,432,011 B1 | 8/2002 | Kanehira et al. | |
| 6,450,910 B1 | 9/2002 | Matsumoto et al. | |
| 6,461,263 B2 | 10/2002 | Suzuki et al. | |
| 6,533,107 B2* | 3/2003 | Suzuki et al. | 198/834 |
| 6,533,691 B2 | 3/2003 | Horie et al. | |
| 6,663,522 B2 | 12/2003 | Horie | |
| 6,733,410 B2 | 5/2004 | Saito | |
| 6,796,920 B2 | 9/2004 | Horie et al. | |
| 2001/0007842 A1* | 7/2001 | Suzuki et al. | 474/213 |
| 2002/0045504 A1 | 4/2002 | Suzuki et al. | |
| 2002/0058561 A1 | 5/2002 | Kanehira et al. | |
| 2002/0119853 A1 | 8/2002 | Horie | |
| 2002/0128101 A1 | 9/2002 | Baddaria | |
| 2003/0027675 A1 | 2/2003 | Suzuki et al. | |
| 2003/0045388 A1 | 3/2003 | Kotera | |
| 2003/0064845 A1 | 4/2003 | Saito | |
| 2003/0119614 A1 | 6/2003 | Saitoh | |
| 2003/0125146 A1 | 7/2003 | Saitoh | |
| 2004/0097314 A1 | 5/2004 | Kotera | |
| 2004/0110591 A1 | 6/2004 | Kotera | |
| 2004/0166978 A1 | 8/2004 | Matsuda et al. | |
| 2006/0058141 A1* | 3/2006 | Young | 474/213 |
| 2006/0068959 A1 | 3/2006 | Young et al. | |
| 2007/0142150 A1* | 6/2007 | Vietoris | 474/212 |
| 2007/0155564 A1 | 7/2007 | Ledvina et al. | |
| 2008/0167151 A1 | 7/2008 | Yonehara et al. | |
| 2008/0312017 A1 | 12/2008 | Young et al. | |

FOREIGN PATENT DOCUMENTS

| | | |
|---|---|---|
| EP | 1 281 890 | 2/2003 |
| EP | 1 293 704 | 3/2003 |
| JP | 55-024203 | 2/1980 |
| JP | 56-150655 | 11/1981 |
| JP | H1-119964 | 8/1989 |
| JP | 2005-248969 | 9/2005 |
| WO | WO 2009/111219 | 9/2009 |

OTHER PUBLICATIONS

Written Opinion mailed Dec. 4, 2009 for International application No. PCT/US2009/056364.

SAE Technical Paper Series, 2007-01-2297, Young, James D., "Inverted Tooth Chain Sprocket with Frequency-Modulated Meshing Features to Reduce Camshaft Drive Noise", May 2007.

International Search Report mailed Dec. 16, 2010 for International application No. PCT/US2010/051609.

Written Opinion mailed Dec. 16, 2010 for International application No. PCT/US2010/051609.

Notification of Related U.S. Appl. No. 12/556,332 filed Sep. 9, 2009.

Notification of Related U.S. Appl. No. 12/814,963 filed Jun. 14, 2010.

SAE Technical Paper Series, 1999-01-1226, Wada, Masakazu et al., "Development of a Small Pitch Silent Chain for a Single-Stage Cam Drive System", Mar. 1999.

Huang, Chintien et al., "The Tooth Contact Analysis of Round Pin Jointed Silent Chains", ASME 2005 International Design Engineering Technical Conferences & Computers and Information in Engineering Conference, DETC2005-84065, Sep. 2005.

Bucknor, Norman Kenneth, "Kinematic and static force analysis of silent chain drives", Columbia University, 1991.

International Search Report mailed May 2, 2012 for International application No. PCT/US2012/028277.

Written Opinion mailed May 2, 2012 for International application No. PCT/US2012/028277.

* cited by examiner

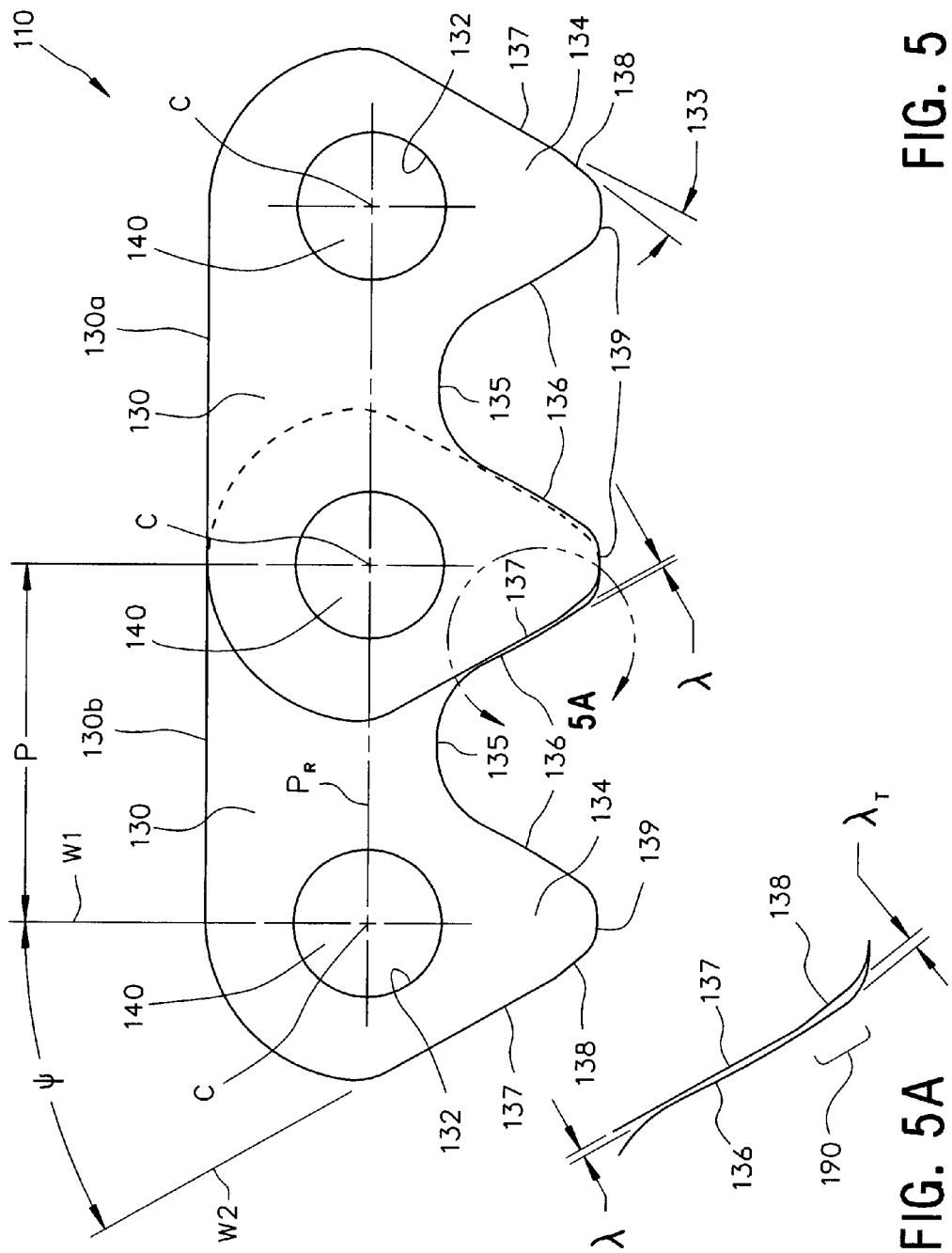

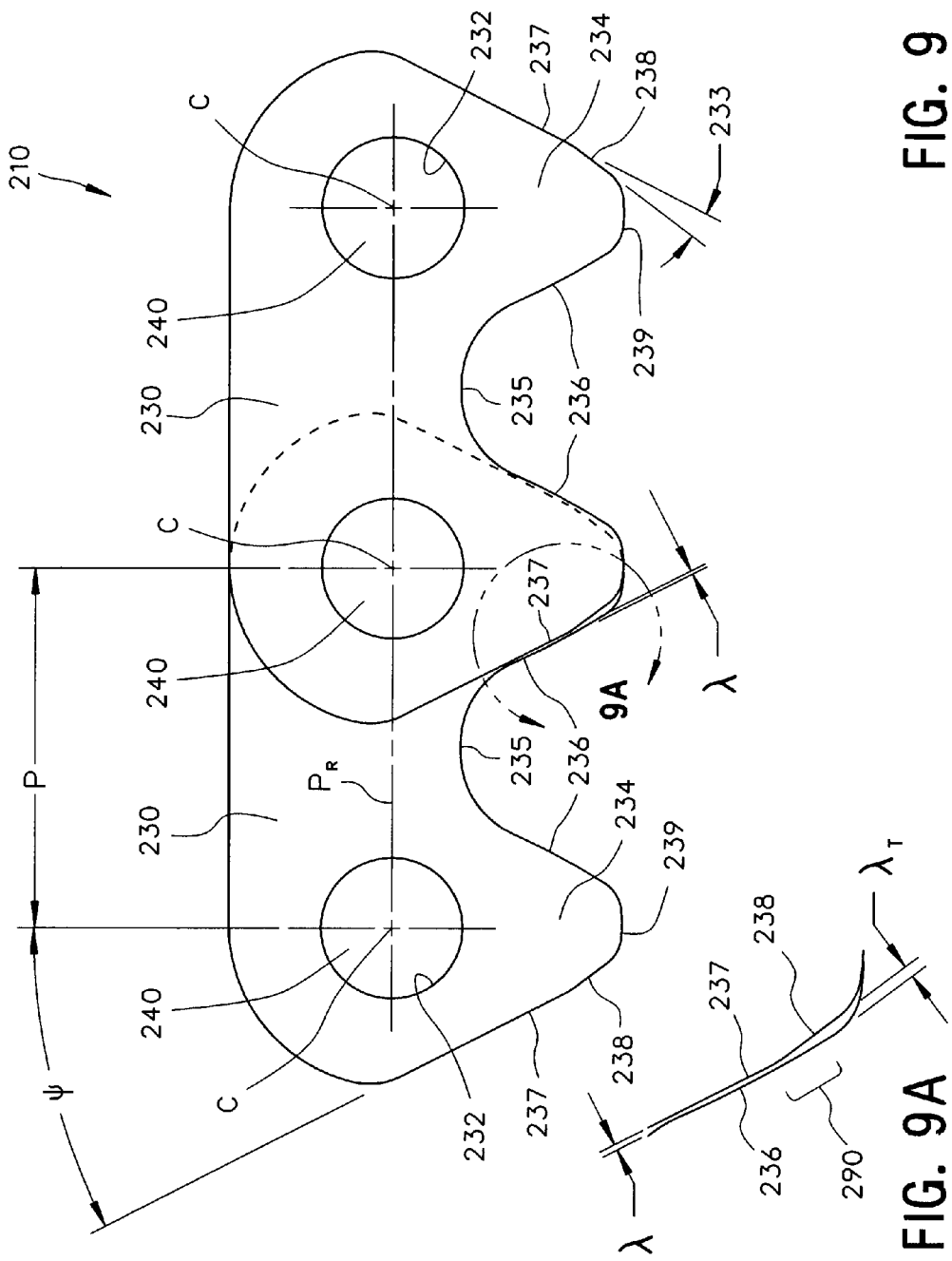

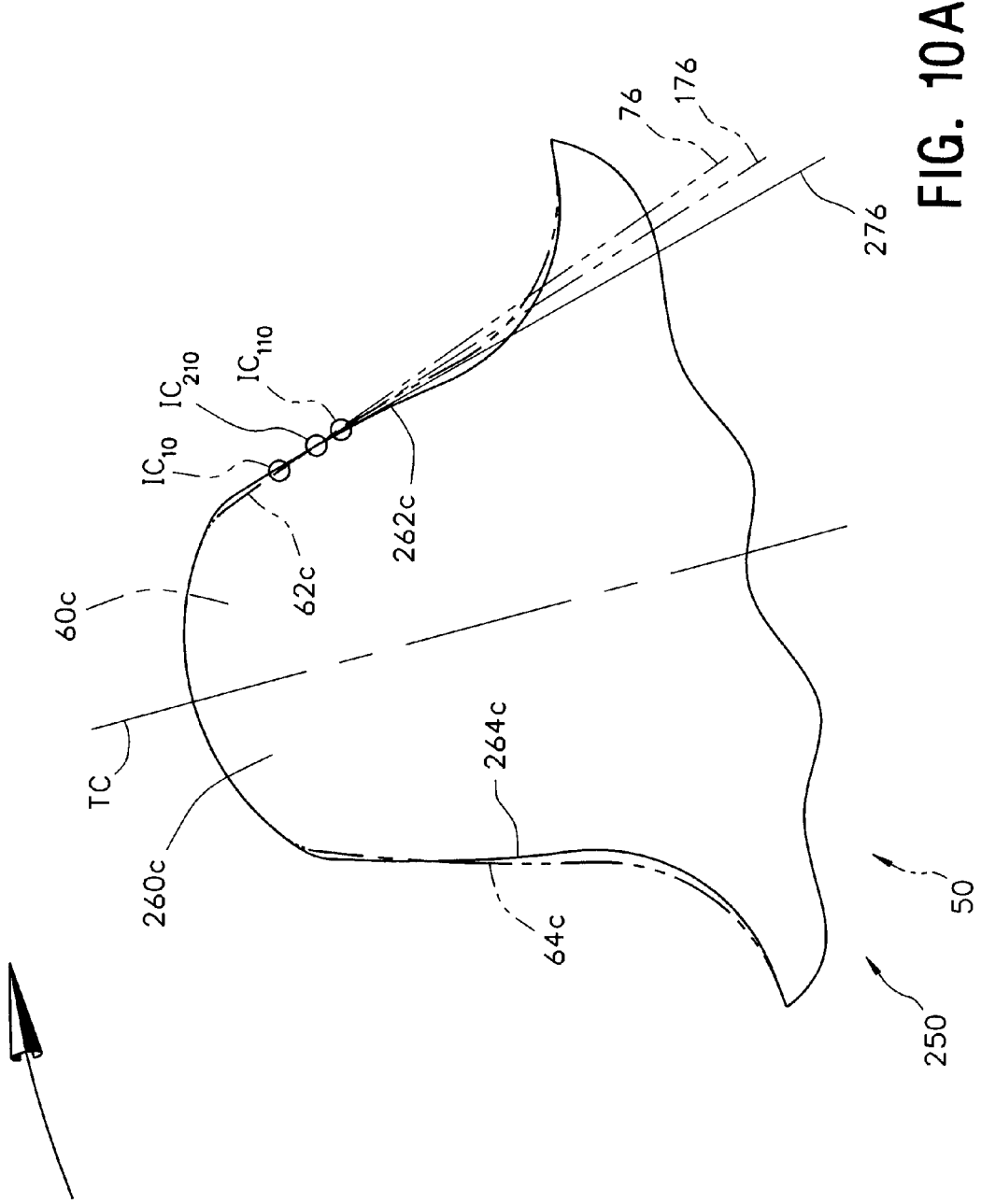

INVERTED TOOTH CHAIN AND SPROCKET DRIVE SYSTEM WITH REDUCED MESHING IMPACT

CROSS-REFERENCE TO RELATED APPLICATION

This application is a continuation-in-part of U.S. patent application Ser. No. 12/814,963 filed Jun. 14, 2010 (Jun. 14, 2010), which is a continuation-in-part of U.S. patent application Ser. No. 12/556,332 filed Sep. 9, 2009 (Sep. 9, 2009), which claims priority from and benefit of the filing date of U.S. provisional application Ser. No. 61/095,393 filed Sep. 9, 2008 (Sep. 9, 2008), and the entire disclosure of each of these prior applications is hereby expressly incorporated by reference into the present specification.

BACKGROUND

Inverted tooth chains 10 have long been used to transmit power and motion between shafts in automotive applications and as shown in FIG. 1, they are conventionally constructed as endless chains with ranks or rows 30a,30b, etc. of interleaved link plates 30 each with a pair of teeth 34 having outside flanks 37, and inside flanks 36 between the teeth defining a crotch 35, and each having two apertures 32 that are aligned across a link row to receive connecting pins 40 (e.g., round pins, rocker joints, etc.) to join the rows pivotally and to provide articulation of the chain 10 about pin centers C as it drivingly engages the sprocket teeth either at the inside flanks ("inside flank engagement") or at the outside flanks ("outside flank engagement") of the link plates at the onset of meshing with the driving and driven sprockets. The pin centers C are spaced at a chain link pitch P. The term "pin centers C" is intended to encompass the axis of rotation of successive link rows 30a,30b relative to each other, regardless of whether the pins 40 comprise round pins, rocker joints or another suitable joint. The outside flanks 37 are straight-sided (but could be curved) and are defined by an outer or outside flank angle ψ. The inside flanks are convexly curved and comprise circular arc segments defined by a radius R centered at an arc center 79 (FIG. 3A).

Although both inside flank engagement and outside flank engagement meshing styles have been used for automotive engine timing drives, inside flank engagement is more common. Referring still to FIG. 1, inside flank meshing contact is facilitated by the outward projection λ of the leading (in terms of chain movement direction) inside flank 36 of a link plate 30 with respect to the outside flank 37 of an adjacent link plate 30 in a preceding row 30a when the link rows 30a,30b are positioned in a straight line as would nominally be the case in the unsupported chain span at the onset of meshing with a sprocket.

Chain-sprocket impact at the onset of meshing is a dominant noise source in chain drive systems and it occurs as a chain link row exits the span and impacts with a sprocket tooth at engagement. The complex dynamic behavior of the meshing phenomenon is well known in the art and the magnitude of the chain-sprocket meshing impact is influenced by various factors, of which polygonal effect (referred to as "chordal action" or "chordal motion") is known to induce a transverse vibration in the "free" or unsupported span located upstream from the sprocket as the chain approaches the sprocket along a tangent line. Chordal motion occurs as the chain engages a sprocket tooth during meshing and it will cause chain motion in a direction perpendicular to the chain travel and in the same plane as the chain and sprockets. This undesirable oscillatory chain motion results in a velocity difference between the meshing chain link row and a sprocket tooth at the point of initial contact, thereby contributing to the severity of the chain-sprocket meshing impacts and the related chain engagement noise levels.

FIGS. 2A and 2B illustrate the chordal rise for a sprocket in which chordal rise CR is conventionally defined as the vertical displacement of a chain pin center C (or other chain joint) as it moves through an angle α/2, where:

$$CR = r_p - r_c = r_p[1 - \cos(180°/N)]$$

and where $r_c$ is the chordal radius or the distance from the sprocket center to a sprocket pitch chord of length P, which is also equal to the chain pitch length; $r_p$ is the theoretical pitch radius of the sprocket, i.e., one-half of the pitch diameter PD; N is the number of sprocket teeth; and α is equal to the sprocket tooth angle or 360°/N. FIG. 2A shows the chain pin center C at a first position where it has just meshed with the sprocket and where it is simultaneously aligned with both the tangent line TL and the sprocket pitch diameter PD. As is known in the art, and as used herein, the tangent line TL is the theoretical straight-line path along which the meshing chain pin centers C approach the sprocket. As shown herein, the tangent line TL is located in a horizontal orientation, in which case the tangent line TL is tangent to the pitch diameter PD at the top-dead-center or 12 o'clock position on the pitch diameter PD, i.e., the tangent line TL is tangent to the pitch diameter PD at a location where a chain pin center is centered on the pitch diameter PD and is also centered on a radial reference line that is normal to the tangent line TL (the reference line being vertical when the tangent line is horizontal as shown herein). FIG. 2B illustrates the location of the same pin center C after the sprocket has rotated through the angle α/2, where it can be seen that the pin center C is transversely displaced by a distance CR as it continues its travel around the sprocket wrap, and this vertical displacement of the pin center results in a corresponding displacement of the upstream chain span and tangent line TL thereof. This transverse displacement of the chain pins C as they move through the chordal rise and fall serves to induce undesired vibration in the unsupported chain span.

One attempt to reduce undesired chordal motion of the chain is described in U.S. Pat. No. 6,533,691 to Horie et al. Horie et al. disclose an inverted tooth chain wherein the inside flanks of each link plate are defined with a compound radius profile intended to smooth the movement of the inside flanks from initial sprocket tooth meshing contact to the fully meshed (chordal) position. Initial meshing contact for the Horie et al link plate form occurs at a convexly arcuate portion of the inside flank at the link toe tip and proceeds smoothly and continuously to a second arcuate portion of the inside flank before transitioning to outside flank full meshing contact of a preceding link.

Chordal motion is also reduced in the system disclosed in U.S. Pat. No. 7,789,783 by Young et al, where the prominence of the inside flanks of the chain link plates relative to the respective outside flanks of link plates in adjacent link rows is defined as a function of the chain pitch P, and the maximum projection of the inside flank Lambda (λ) relative to the related outside flank is defined to fall in the range of 0.010× P≤λ≤0.020×P. Young et al disclose a link plate that also incorporates inside flank initial meshing contact to limit chordal motion, but its inside flank meshing contact begins and ends on the same convexly arcuate portion of the link plate before the meshing contact transitions to outside flank full meshing contact of a preceding link plate to complete the meshing cycle.

In U.S. Pat. No. 6,244,983, Matsuda discloses a link plate having inside flank meshing contact with the sprocket tooth for the full meshing cycle. Although the outside flanks of the Matsuda link plate do not contact the sprocket teeth, its inside flank meshing geometry serves to restrict chordal motion during engagement.

The above mentioned prior art inverted tooth chains all have features to beneficially limit chordal motion during meshing. However, another important factor to have an adverse influence on chain drive noise levels was not sufficiently considered in the link plate design for these chains—as well as for other prior art inverted tooth chains—and that factor is the meshing impact geometry during the chain-sprocket engagement process.

As shown in FIG. 3 and more clearly in FIG. 3A, a prior art chain link row 30c of chain 10 is at the onset of meshing with a sprocket tooth 60c of a conventional sprocket 50 in a chain drive system 15 including the chain 10, sprocket 50, and at least one other sprocket meshing with the chain 10. Reference will usually be made only to the individual chain link plates 30 visible in the foreground of each row 30a,30b,30c,etc., but those of ordinary skill in the art will recognize that the discussion applies to multiple link plates 30 across each row. Successive pin centers C are numbered C1, C2, C3, C4, etc. to distinguish them from each other.

The link row 30c is shown at the instant of initial meshing contact with a corresponding sprocket tooth 60c, i.e., at the instant of initial contact between the leading inside flank 36 of the chain link plate and the engaging flank 62c of the sprocket tooth 60c at an initial contact location IC on the engaging flank 62c. An initial contact angle Theta (θ) is defined between a first radial reference line L1 originating at the axis of rotation of the sprocket and extending normal to the tangent line TL and a second radial reference line TC originating at the axis of rotation of the sprocket and extending through the tooth center of the subject sprocket tooth 60c. At the instant of initial meshing impact IC for link row 30c, the preceding link row 30b exits the chain span and enters a "suspended state", i.e., the link plates 30 of row 30b are not in direct contact with the sprocket 50 and are suspended between the meshing row 30c and a preceding row 30a that is in full meshing contact with a preceding sprocket tooth 60b. Link row 30b will remain in this suspended state as row 30c articulates through its sliding contact with the engaging flank 62c of sprocket tooth 60c from its initial meshing contact location IC to a final inside flank meshing contact location IF, at which time row 30b completes its meshing cycle and transitions into a position where its trailing outside flanks 37 make full meshing contact at location OF with sprocket tooth 60c (contact locations IF and OF are shown in FIGS. 4 and 4A). FIGS. 4 and 4A show the point in the meshing cycle referred to as "simultaneous meshing" in that link rows 30b and 30c are in simultaneous contact with sprocket tooth 60c, and with the next increment of sprocket rotation, link row 30c will separate from its inside flank meshing contact. Upon separation, link row 30c remains in the span, and it will enter the suspended state at the instant of initial meshing impact IC for a following row 30d with sprocket tooth 60d.

It should be noted that prior to the instant of initial meshing impact for link row 30c (referring again to FIGS. 3 and 3A), the chain span effectively rotates about pin center C1 as row 30c articulates toward meshing impact IC with the sprocket tooth 60c. Thus, the pin center C1 can be referred to as the "controlling pin center." The controlling pin center C1 is the closest preceding (downstream) pin center relative to the leading pin center C2 of the meshing link row 30c (the controlling pin center C1 is also the trailing pin center of the closest (in terms of chain travel direction) fully meshed link row 30a). As such, the following relationships are defined:

a meshing contact angle Tau (τ) is defined between the tangent line TL and an initial contact reference line 70 that passes through both the controlling pin center C1 and the initial contact location IC;

the initial contact reference line 70 defines a length L lever arm (FIG. 3A) between the controlling pin center C1 and the initial contact location IC;

a link plate entrance angle Beta (β) is defined between the initial contact reference line 70 and an inside flank reference line 74 that passes through the arc center 79 of the inside flank radius R and the initial contact location IC (the inside flank reference line 74 will be normal to the involute curve (or radial arc segment or other curved surface) of the engaging flank 62c of the sprocket tooth 60c);

a meshing impact angle Sigma (σ) is defined between the tangent line TL and the inside flank reference line 74, i.e., θ=τ+β.

Chain-sprocket meshing impact results from a velocity difference between the meshing link row 30c and a sprocket tooth 60c at the initial contact location IC, and the related impact energy E generated as the sprocket tooth collects the meshing link row 30c from the chain span at the instant of initial meshing impact is defined by the equation:

$$E = CmL^2\omega^2 \cos^2(90-\beta)$$

where C is a constant, m is equal to the mass of the single meshing link row 30c, L is the length from the controlling pin center C1 to the initial contact location IC, ω is the angular velocity of the sprocket, and β is the link plate meshing entrance angle. The meshing impacts along with the associated noise levels can be reduced by decreasing the velocity difference, which can be accomplished by reducing the meshing entrance angle β.

In addition, the impact energy E equation considers only the mass of the meshing link row 30c, and it does not take into account chain tension $C_T$ and this chain tension will add to the resultant meshing impact energy E and the associated overall noise levels. The chain tension $C_T$ will act on the sprocket tooth 60c at the onset of meshing and the tooth impact reaction force $F_S$, equal and opposite to a link impact force $F_L$, will vary with the magnitude of the meshing impact angle σ, where:

$$F_S = \frac{F_H}{\cos\sigma}$$

and where $F_H$ will be equal to $C_T$ in order to satisfy the summation of horizontal forces being equal to zero. These relationships are shown in FIGS. 3 and 3A (note that in FIG. 3A, the meshing impact angle Sigma (σ) and its component angles are shown relative to a reference line 72 that is parallel to the tangent line TL and extending through the initial contact location IC, coincident with the force vector $F_H$). It should be noted that the sprocket tooth 60c, along with the next several teeth forward (downstream) of tooth 60c, share in the load distribution of the chain tension $C_T$ with the largest reaction force $F_H$ occurring at location IC of tooth 60c at the onset of initial meshing contact. The remaining portion of the chain tension loading acting on the several teeth forward of tooth 60c does not influence the meshing noise levels and is therefore not a consideration for this present development. To summarize, the link impact force vector $F_L$ acts at the meshing impact location IC during initial meshing contact and adds to the total meshing impact energy E and the related noise levels.

As described above, FIG. 4 shows simultaneous meshing contact, where the leading inside flanks 36 of link row 30c are contacting the engaging flank 62c of sprocket tooth 60c at location IF, and the trailing outside flanks 37 of preceding link row 30b are contacting the engaging flank 62c are location OF. FIG. 4A is a greatly enlarged partial view of FIG. 4 that also shows the forces resulting from the geometry of the simultaneous meshing contact phenomenon. This instant at which the tooth 60c transitions from "inside flank only" contact with leading inside flanks 36 of link row 30c to achieve simultaneous outside flank contact with trailing outside flanks 37 of preceding link row 30b can also be referred to as a transition point, and also defines the end of the meshing cycle for the tooth 60c, because the link row 30b is now fully meshed with both its leading and trailing pin centers C1,C2 located on the pitch diameter PD. A transition angle Phi ($\phi$) is defined between the first radial reference line L1 and the second radial reference line TC marking the tooth center of tooth 60c.

FIGS. 4 and 4A correspond respectively to FIGS. 3 and 3A, but relate to the transition phenomenon, and show that:

a transition contact angle Tau' ($\tau'$) is defined between the tangent line TL and a transition contact reference line 80 that passes through both the outside flank contact location OF and the controlling pin center C1 which, for the transition phenomenon, is the leading pin center of the link row transitioning to trailing outside flank contact at location OF (or the pin center C that is immediately preceding the pin center at the interface between the simultaneously meshing link rows);

the transition contact reference line 80 defines a length L' lever arm between the controlling pin center C1 and the outside flank contact location OF;

a link plate transition angle Beta' ($\beta'$) is defined between the transition contact reference line 80 and an outside flank reference line 84 that extends normal to the trailing outside flank 37 (the outside flank reference line 84 will also be normal to the involute curve (or radial arc segment or other curved surface) of the engaging flank 62c of the sprocket tooth 60c);

a transition impact angle Sigma' ($\sigma'$) is defined between the tangent line TL and the outside flank reference line 84, i.e., $\sigma'=\tau'+\beta'$.

It should be noted that features in FIGS. 4 and 4A that correspond to features of FIGS. 3 and 3A are labeled with corresponding reference characters including a prime (') designation, and not all are discussed further. Also, in FIG. 4A, the transition impact angle Sigma' ($\sigma'$) and its constituents are shown relative to a reference line 82 that is parallel to the tangent line TL and extending through the outside flank contact location OF, coincident with the force vector $F'_H$.

The intensity of the secondary meshing impact and the related noise level as link row 30b transitions to full chordal meshing contact at location OF with sprocket tooth 60c is a smaller value as compared to the above-described initial meshing impact at location IC and its resulting meshing noise level. Firstly, the transition impact angle $\sigma'$ will always be a smaller value than the initial meshing impact angle $\sigma$. Secondly, the outside flank contact at location OF occurs as the link row 30b transitions from the suspended state to the fully meshed state, which is believed to be less significant in terms of impact force as compared to the initial contact between the chain 10 and sprocket 50, in which a link row is collected from the chain span to impact with a sprocket tooth 60 at the onset of meshing. In addition, noise and vibration testing has shown the transition meshing impact of the outside flank 37 at location OF to contribute less to the overall meshing noise levels than the initial meshing impact of the inside flank 36 at location IC.

The sprocket 50 is conventional and the teeth 60 (i.e., 60a, 60b, 60c, etc.) are each symmetrically defined about a radial tooth center TC to have an engaging flank 62 (i.e., 62a,62b, 62c,etc.) that makes initial contact with the chain 10 during meshing and a matching disengaging flank 64 (i.e., 64a,64b, 64c,etc.). The tooth centers TC bisect each tooth 60 and are evenly spaced in degrees(°) at a tooth angle $\alpha=360°/N$. The involute form of the engaging tooth flanks 62 (and disengaging flanks 64) is generated from a base circle and the base circle is defined as:

Base Circle=PD×COS(PA), where

PD=sprocket pitch diameter, and PA=tooth pressure angle

Furthermore, the pitch diameter PD, itself, is defined as:

PD=P/SIN(180/N), where where P=pitch, and N=number of teeth in sprocket.

The involute tooth form can be approximated by a radial tooth form, and the pressure angle PA of a radial tooth form can likewise be determined. In any case, it is generally known that an engaging flank 62 defined with a smaller pressure angle is steeper (closer to a radial line originating at the sprocket axis of rotation) as compared to an engaging flank defined with a larger pressure angle. As such, a reference line tangent to the engaging flank 62 at the initial contact location IC will define an angle between itself and a radial reference line located between the engaging flank and the immediate downstream (leading) disengaging flank 64 that is smaller when the pressure angle is decreased and that is larger when the pressure angle is increased. Prior art systems have not substantially altered the conventional known sprocket tooth pressure angles to permit optimization of the design of the chain link plates 30 in order to minimize link impact force $F_L$ and the related impact energy E. Known sprocket pressure angles in degrees(°) are shown below in TABLE 1, and the sprocket 50 conforms to these conventions (all teeth 60 have the same pressure angle PA):

TABLE 1

| Sprocket Tooth Count (N) | Known Sprocket Pressure Angle |
| --- | --- |
| <19 | 34° |
| 19-25 | 33° |
| 26-60 | 31.5° |

SUMMARY

In accordance with one aspect of the present development, a chain and sprocket drive system includes a sprocket comprising a plurality of teeth, wherein each tooth includes an engaging flank and a disengaging flank, and an inverted tooth chain meshed with the sprocket. The inverted tooth chain includes a plurality of rows of links that each articulate relative to a preceding link row about a leading pin center and that each articulate relative to a following link row about a trailing pin center. The leading and trailing pin centers are spaced from each other at a chain pitch P. Each of the rows includes leading inside flanks and trailing outside flanks, wherein the leading inside flanks of each row project outwardly relative to a working portion of the trailing outside flanks of a preceding row and comprise an inside flank radius R. The chain approaches the sprocket along a tangent line and the engaging flank of each sprocket tooth makes initial meshing contact with the chain at an initial contact location on the leading inside flanks of a meshing row of the chain at an instant of initial meshing contact. At the instant of initial meshing contact, a chain row immediately preceding the meshing row includes a leading pin center that is located on a pitch diameter of the sprocket so as to be a controlling pin center. For each row of the chain that is fully meshed with the sprocket, its leading and trailing pin centers are located on the pitch diameter PD and its trailing outside flanks are in contact with one of the engaging flanks. A meshing contact angle Tau ($\tau$) is defined between the tangent line TL and an initial contact reference line that passes through both the controlling pin center and the initial contact location. A link plate entrance angle Beta ($\beta$) is defined between the initial contact reference line and an inside flank reference line that passes through an arc center of the inside flank radius and the initial contact location. A meshing impact angle Sigma ($\sigma$) is defined between the tangent line and the inside flank reference line such that $\sigma=\tau+\beta$, and $\sigma \leq 34°$. The initial contact location is spaced by an initial contact distance $IC_D$ from a pin center reference line that extends between the leading and trailing pin centers of the meshing link row, wherein $0.49 P \leq IC_D \leq 0.53 P$.

In accordance with another aspect of the present development, a chain and sprocket drive system includes a first sprocket with a first plurality of teeth and a second sprocket with a second plurality of teeth, wherein the first and second sprockets have an unequal number of teeth. An inverted tooth chain is meshed with both the first and second sprockets and includes a plurality of rows of links that each articulate relative to a preceding link row about a leading pin center and that each articulate relative to a following link row about a trailing pin center, wherein said leading and trailing pin centers are spaced from each other at a chain pitch P. Each of the rows of the chain includes leading inside flanks and trailing outside flanks, wherein the leading inside flanks of each row project outwardly relative to a working portion of the trailing outside flanks of a preceding row and include an inside flank radius R. For both the first and second sprockets, the chain approaches the sprocket along a tangent line and the engaging flank of each sprocket tooth makes initial meshing contact with the chain at an initial contact location on the leading inside flanks of a meshing row of the chain at an instant of initial meshing contact. At the instant of initial meshing contact, a chain row immediately preceding the meshing row includes a leading pin center that is located on a pitch diameter of the sprocket so as to be a controlling pin center. For each row of the chain that is fully meshed with the sprocket, its leading and trailing pin centers are located on the pitch diameter PD and its trailing outside flanks are in contact with one of the engaging flanks. A meshing contact angle Tau ($\tau$) is defined between the tangent line TL and an initial contact reference line that passes through both the controlling pin center and the initial contact location. A link plate entrance angle Beta ($\beta$) is defined between the initial contact reference line and an inside flank reference line that passes through an arc center of the inside flank radius and the initial contact location. A meshing impact angle Sigma ($\sigma$) is defined between the tangent line and the inside flank reference line such that $\sigma=\tau+\beta$. The meshing impact angle Sigma ($\sigma$) defined by the first sprocket and the chain is equal to the meshing impact angle Sigma ($\sigma$) defined by the second sprocket and the chain.

BRIEF DESCRIPTION OF DRAWINGS

The invention comprises various components and arrangements of components, preferred embodiments of which are illustrated in the accompanying drawings wherein:

FIG. 5 shows first and second link rows of an inverted tooth chain formed in accordance with a first embodiment of the present development, with the guide plates removed to reveal the underlying link plates;

FIG. 5A is a greatly enlarged view of detail region 5A of FIG. 5;

FIG. 9 shows first and second link rows of an inverted tooth chain formed in accordance with a second embodiment of the present development, with the guide plates removed to reveal the underlying link plates;

FIG. 9A is a greatly enlarged view of detail region 9A of FIG. 9;

FIG. 10A is a greatly enlarged view of a tooth of the sprocket of FIG. 10 with a tooth of the conventional sprocket of FIG. 3 overlaid in phantom lines;

DETAILED DESCRIPTION

Figure 5B:
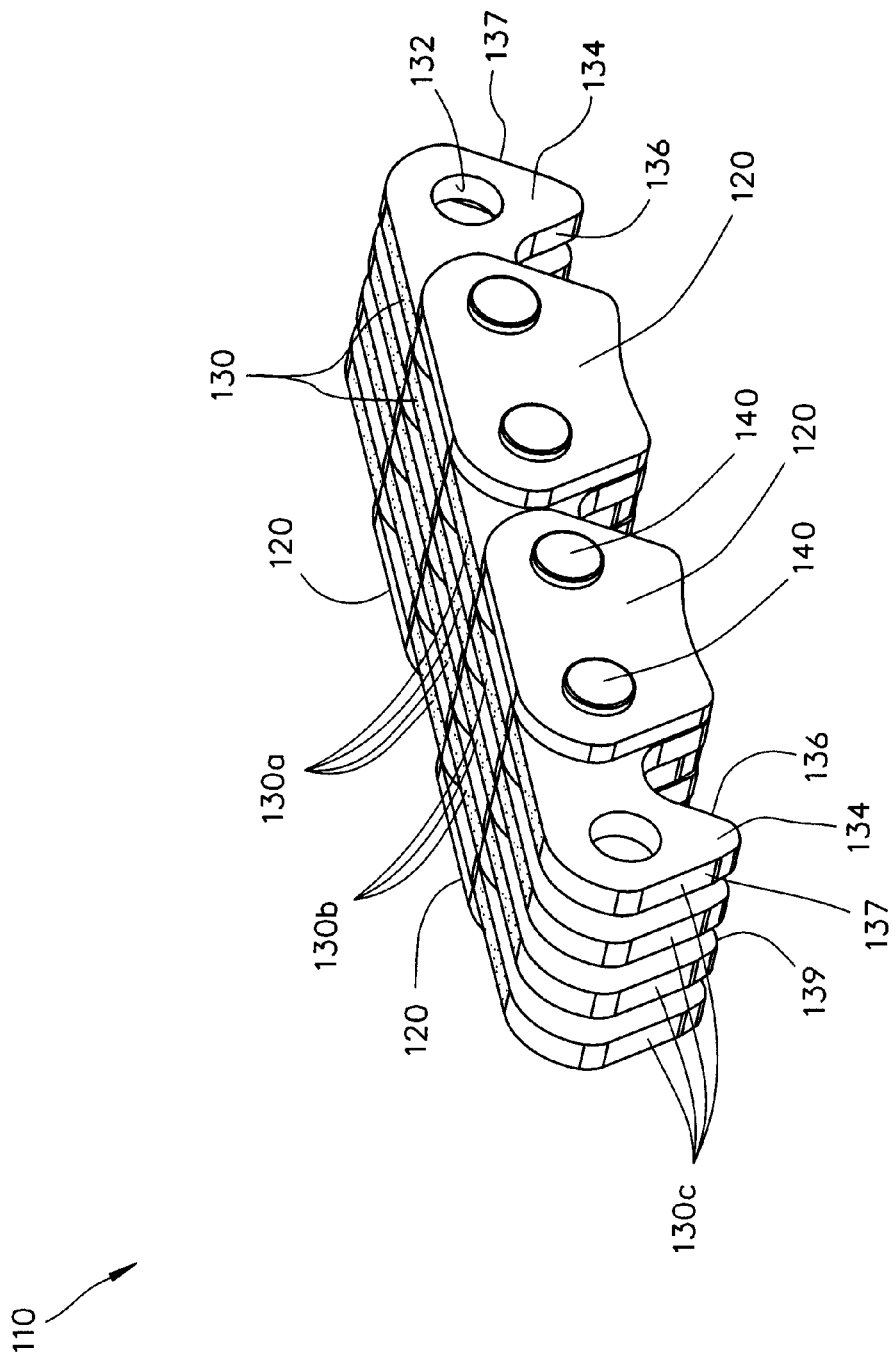
FIG. 5B is an isometric view of multiple link rows of the chain of FIG. 5 including guide plates.

FIG. 5 is an enlarged illustration of first and second rows of an inside flank engagement inverted tooth chain 110 formed in accordance with the present development (guide plates of the chain are not shown), showing a preferred inside flank projection Lambda (λ) and outside flank profile. FIG. 5A is an enlarged view of detail region 5A of FIG. 5 that illustrates the inside flank projection $\lambda_T$ relative to the outside flank chamfer 138 near the link tooth tips 139. FIG. 5B is an isometric view of a chain segment incorporating the link plates of FIG. 5 in accordance with the present invention to define the inverted tooth chain 110.

The chain 110 comprises ranks or rows 130a,130b,130c, etc. of interleaved inside links or link plates 130 each with a pair of teeth 134 having outside flanks 137 and inside flanks 136, with the inside flanks 136 of the teeth 134 defining a crotch 135 therebetween. The teeth 134 have respective toes or tips 139. Each link plate 130 comprises two apertures 132 that are aligned across a link row to receive connecting pins 140 (e.g., round pins, rocker joints, etc.) to join the rows pivotally and to provide articulation of the chain about pin centers C as it drivingly engages the sprocket teeth at the inside flanks 136 ("inside flank engagement") at the onset of meshing with a sprocket such as the conventional sprocket 50. The pin centers C are spaced from each other at a chain pitch length or link pitch P. The term "pin(s)" as used herein means round pins or rocker joints or any other stud or pin-like structure that is inserted into the aligned apertures 132 to pivotally connect adjacent link rows 130a,130b,130c, etc. of the chain 110 or the other chains disclosed herein. Correspondingly, the term "pin centers" as used herein is intended to encompass the axis of rotation of successive link rows 130a,130b,130c relative to each other, regardless of whether the pins 140 comprise round pins, rocker joints or other suitable joints. First and second guide plates 120 (FIG. 5B) flank every other link row (the so-called "guide rows") and serve to align the chain 110 on a sprocket but do not mesh with the sprocket teeth (the guide plates 120 are not shown in most of the figures hereof in order to reveal the underlying link plates 130). The leading (in terms of chain movement direction) inside flanks 136 of each link row 130a,130b,130c project outward relative to the trailing outside flanks 137 of the preceding link row 130a,130b,130c by a projection amount λ when the link rows are positioned in a straight line with all pin centers C aligned along the tangent line TL as would nominally be the case in the unsupported chain span at the onset of meshing with a sprocket such as the sprocket 50. As described in the background above, the tangent line TL is the theoretical straight-line path along which the meshing chain pin centers approach the sprocket. As shown herein, the tangent line TL is located in a horizontal orientation, in which case the tangent line TL is tangent to the pitch diameter PD at the top-dead-center or 12 o'clock position on the pitch diameter PD, i.e., the tangent line TL is tangent to the pitch diameter PD at a location where a chain pin center is centered on the pitch diameter PD and is also centered on a radial reference line that is normal to the tangent line TL (the reference line being vertical when the tangent line is horizontal as shown herein).

Each link plate 130 is identical to the others and is formed symmetrically about a vertical plane arranged perpendicular to the link plate 130 midway between the pin centers C. The outside flanks 137 are straight-sided (but could be curved) and for this first embodiment, the outer or outside flank angle Psi (ψ) is defined by 30°<ψ≤30.5°, where ψ is defined between a first reference line W1 that is perpendicular to a reference line $P_R$ connecting the pin centers C and a second reference line W2 coincident with the outside flank 137. The inside flanks 136 have a convexly arcuate form and the inside flanks will preferably project outwardly relative to the outside flanks of adjacent link rows by a projection amount Lambda (λ) to satisfy the relationship 0.007 P≤λ≤0.017 P where P is equal to the chain pitch length. The inside flank 136 is formed to satisfy the relationship:

$$P \leq R < 2P$$

where R is the radius of curvature of the inside flank 136 and P is the chain pitch length. Each inside flank 136 is defined by a radial arc segment defined by the radius R centered at an arc center 179 (FIG. 6A) and that extends from the crotch 135 to the tip 139. The outside flanks 137 include a chamfer 138 of any desired angle adjacent the tip 139. The chamfer 138 assures that the initial meshing contact region 190 (see FIG. 5A) for a leading inside flank 136 will always project outwardly from the trailing outside flank 137 of the preceding link plate 130 at the onset of meshing by an amount $\lambda_T > \lambda$, particularly when the inside flank projection Lambda (λ) is at its lower manufacturing limit. As shown, the chamfer 138 is flat and defines a chamfer angle β3 between itself and the plane of the remainder of the outside flank 137. A smaller value for Lambda (λ) will beneficially provide a smaller angle Beta (β). It should be noted that Lambda (λ) is measured relative to the straight "contact" or "working" portion of the outside flank 137 when the chain 110 is pulled straight. First and second consecutive rows of the chain are deemed to be pulled straight when all pin centers C thereof located on a single line. The working portion of an outside flank 137 is the region thereof where the outside flank contact location OF is located (see FIGS. 7 and 7A), for all sprocket tooth counts intended to be meshed with the chain 110. The chamfer 138 is referred to as a "non-contact" or "non-working" portion of the outside flank 137 because it will not contact the sprocket teeth for all sprocket tooth counts intended to be meshed with the chain 110. The chamfer 138, which need not be flat, is included to ensure that at least the portion of the leading inside flanks 136 of the adjacent link row required to make initial contact IC (see FIGS. 6 and 6A) with the sprocket 50 will always project outwardly relative to the preceding or downstream link row a sufficient distance for all manufacturing tolerance conditions to ensure that the leading inside flanks 136 make initial contact with the sprocket as described herein.

Figure 6:
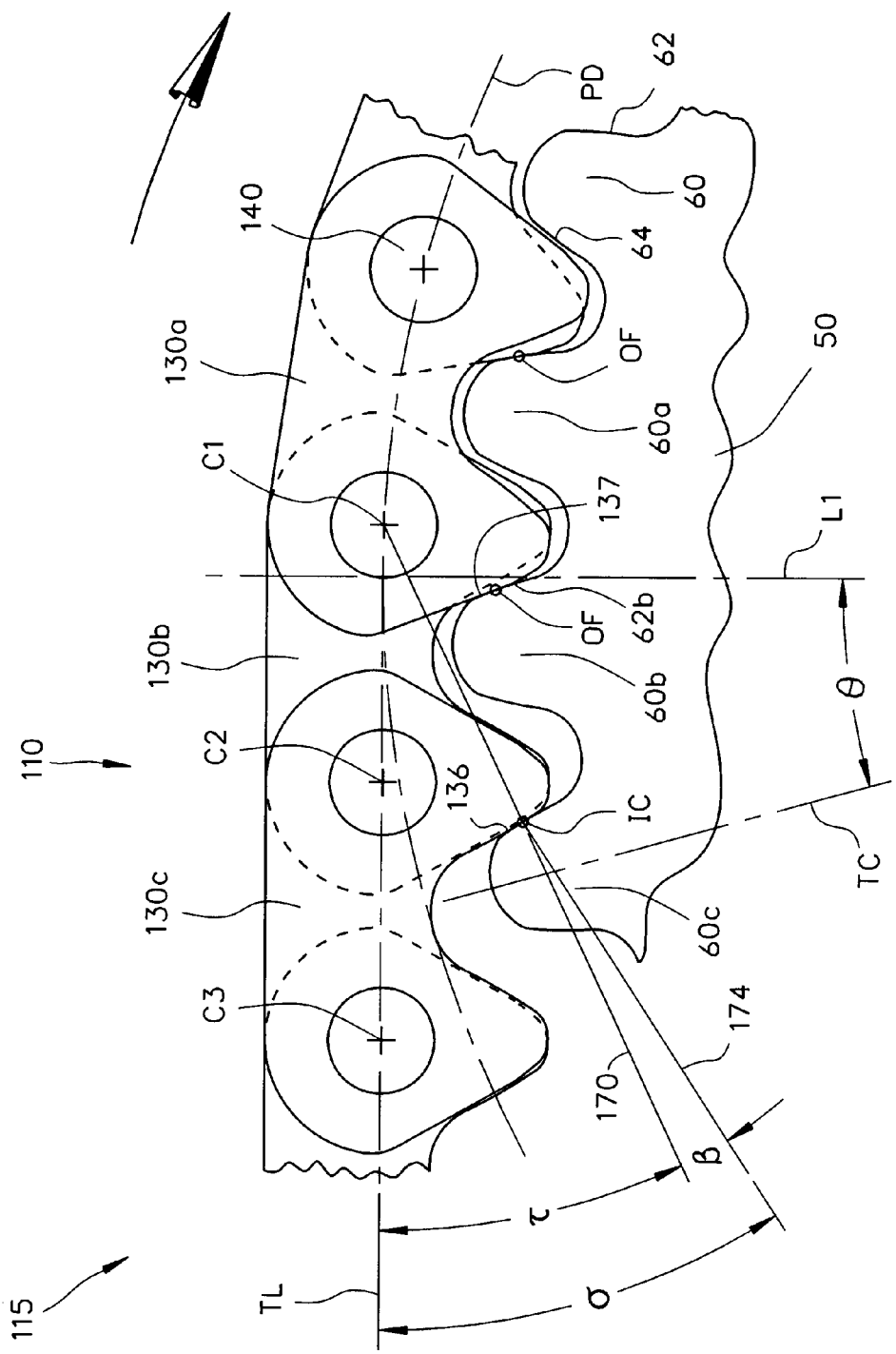
FIG. 6 shows the chain of FIG. 5 with a link row at the onset of meshing with a sprocket tooth of the conventional sprocket of FIG. 3.
Figure 6A:
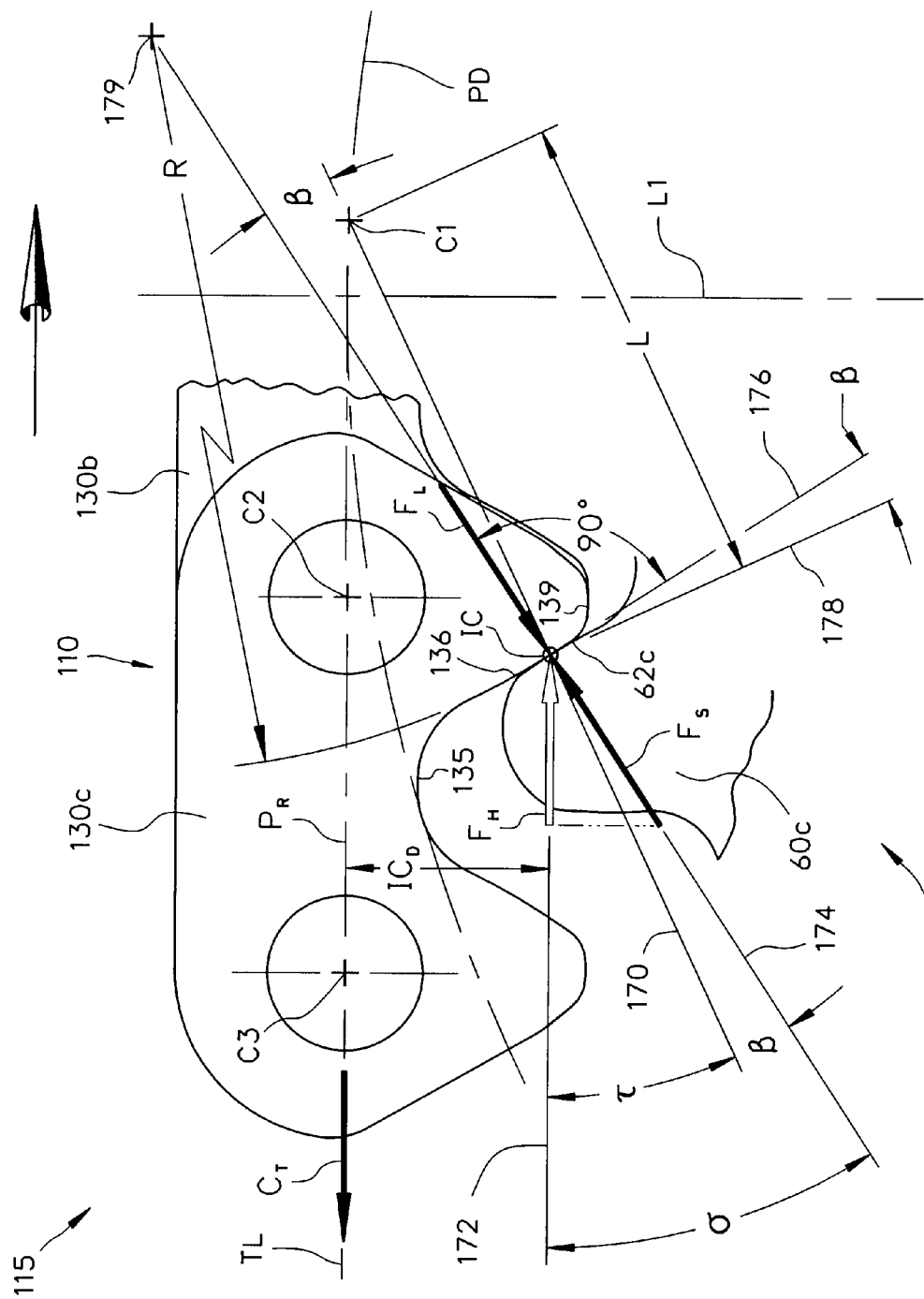
FIG. 6A is an enlarged portion of FIG. 6.

The chain 110 will mesh with a conventional sprocket 50 as shown in FIGS. 6 and 6A and at least one other conventional sprocket 50 of the same or different tooth count to define a chain drive system 115. In FIGS. 6 and 6A, the chain link row 130c is at the onset of meshing with a sprocket tooth 60c of sprocket 50 (reference will usually be made only to the individual chain link plates 130 visible in the foreground of each row 130a,130b,130c,etc., but those of ordinary skill in the art will recognize that each row includes multiple chain link plates 130 arranged across each row). Successive pin centers C are numbered C1, C2, C3, C4, etc. to distinguish them from each other. The row 130c is shown at the instant of initial meshing contact with a corresponding sprocket tooth 60c, i.e., at the instant of initial contact between the chain link plate leading inside flank 136 and the engaging flank 62c of the sprocket tooth 60c at an initial contact location IC on the engaging flank 62c. An initial contact angle Theta (θ) is defined between a first radial reference line L1 originating at the axis of rotation of the sprocket and extending normal to the tangent line TL and a second radial reference line TC originating at the axis of rotation of the sprocket and extending through the tooth center of the subject sprocket tooth 60c. The meshing cycle for the preceding sprocket tooth 60b was previously completed, with the leading pin center C1 of link row 130b (which is also the trailing pin center C of link row 130a) located on the pitch diameter PD as controlled by contact between the trailing outside flank 137 of link row 130a and the engaging flank 62b of the sprocket tooth 60b at location OF. Link row 130b is in the above-described "suspended state" with neither its leading inside flanks 136 nor its trailing outside flanks 137 directly contacting the sprocket 50. The pin center C1 is deemed the "controlling pin center" in that it is the closest (in terms of chain travel direction) preceding or downstream pin center C relative to the leading pin center C2 of the meshing link row 130c (the controlling pin center C1 is also the trailing pin center of the closest (in terms of chain travel direction) fully meshed link row 130a). As such, the following relationships are defined:

- a meshing contact angle Tau (τ) is defined between the tangent line TL and an initial contact reference line 170 that passes through both the controlling pin center C1 and the initial contact location IC;
- the initial contact reference line 170 defines a length L lever arm between the controlling pin center C1 and the initial contact location IC;
- a link plate entrance angle Beta (β) is defined between the initial contact reference line 170 and an inside flank reference line 174 that passes through the arc center 179 of the inside flank radius R and the initial contact location IC (the inside flank reference line 174 will be normal to the involute curve (or radial arc segment or other curved surface) of the engaging flank 62c of the sprocket tooth 60c);
- a meshing impact angle Sigma (σ) is defined between the tangent line TL and the inside flank reference line 174, i.e., σ=τ+β.

Figure 1:
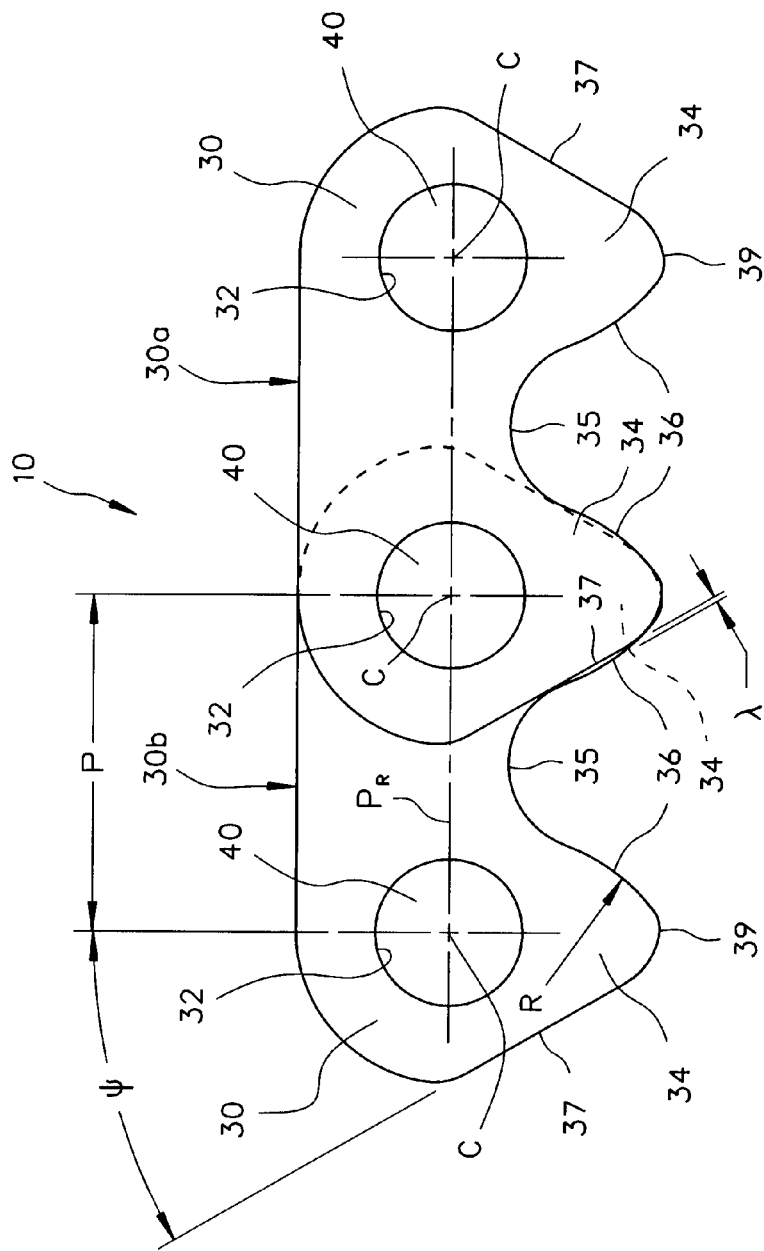
FIG. 1 illustrates first and second link rows of a known inverted tooth chain with the guide plates removed to reveal the underlying link plates.
Figure 2B:
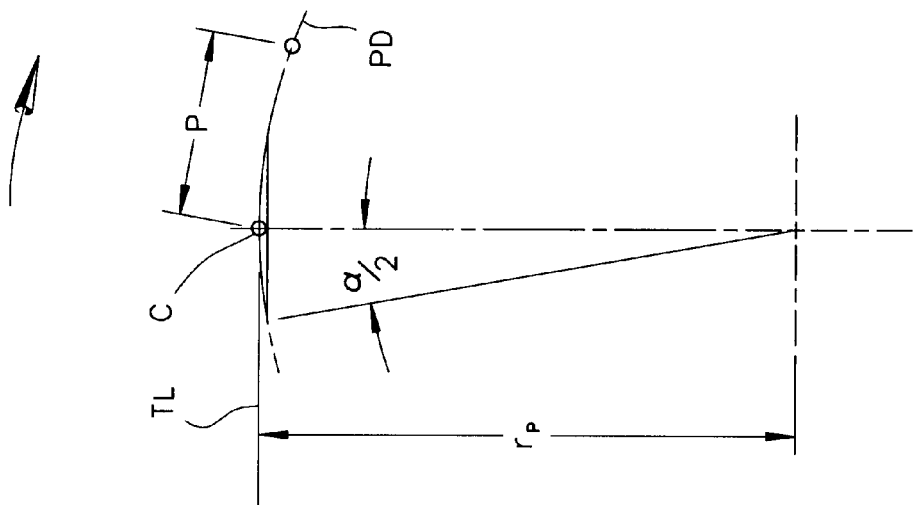
FIGS. 2A and 2B illustrate chordal rise for a sprocket.
Figure 2A:
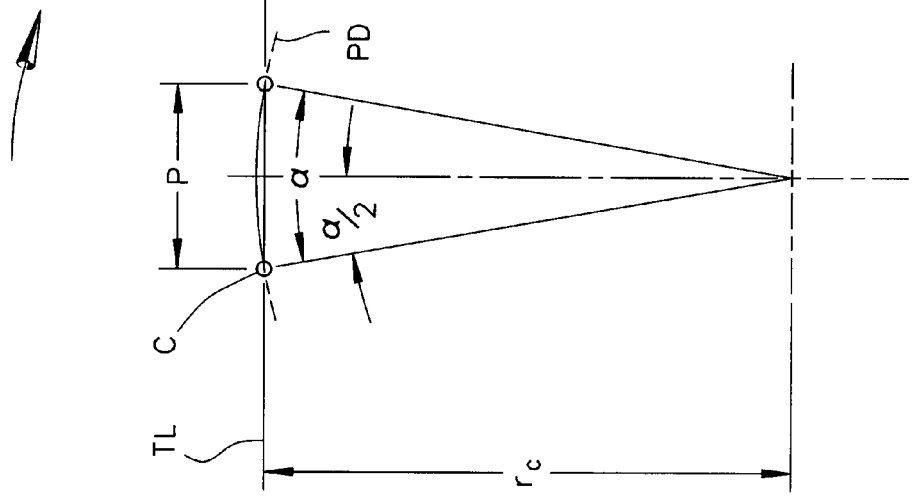
Figure 3:
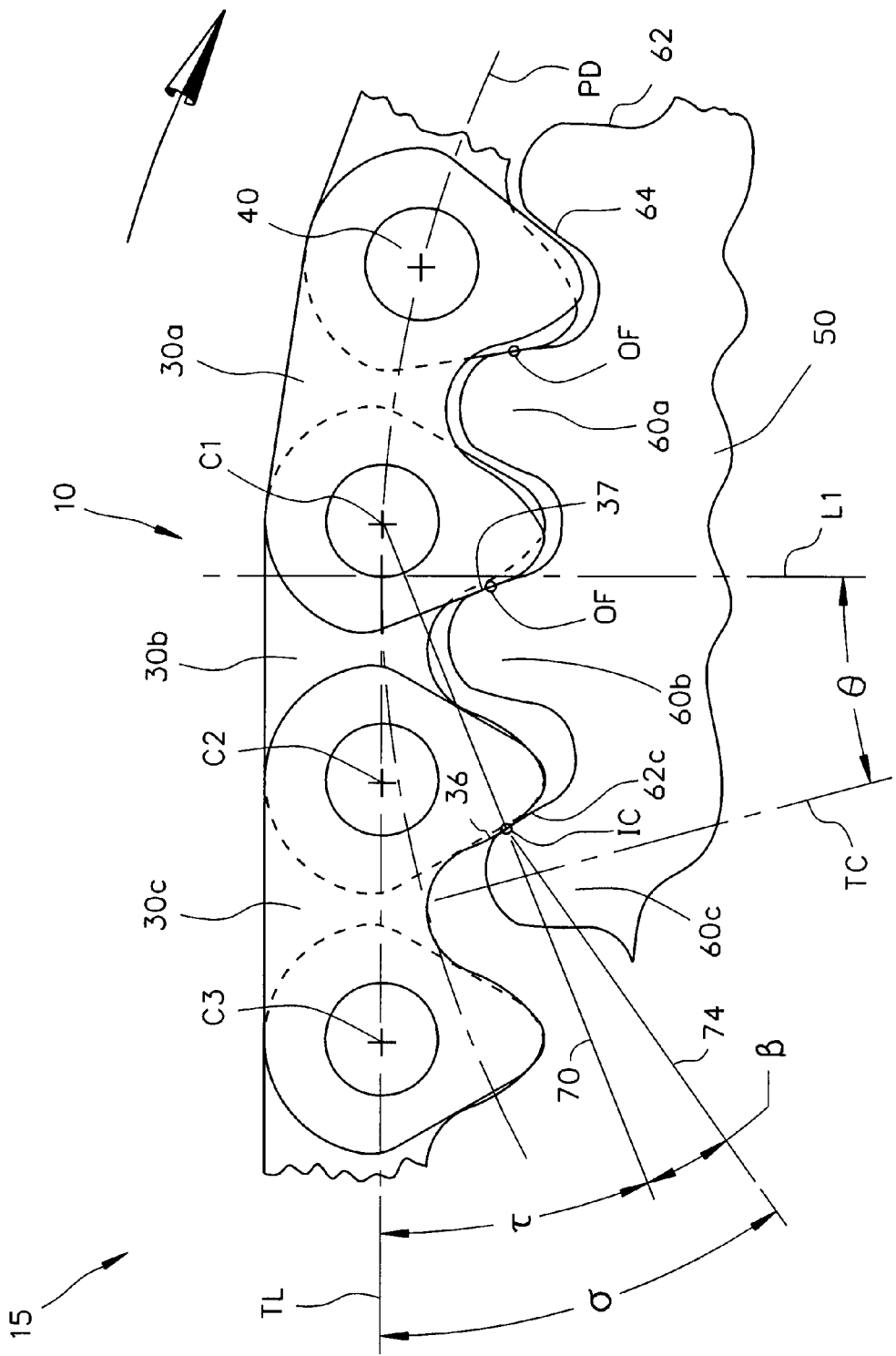
FIG. 3 shows the chain of FIG. 1 with a link row at the onset of meshing with a sprocket tooth of a known sprocket in a chain drive system.
Figure 3A:
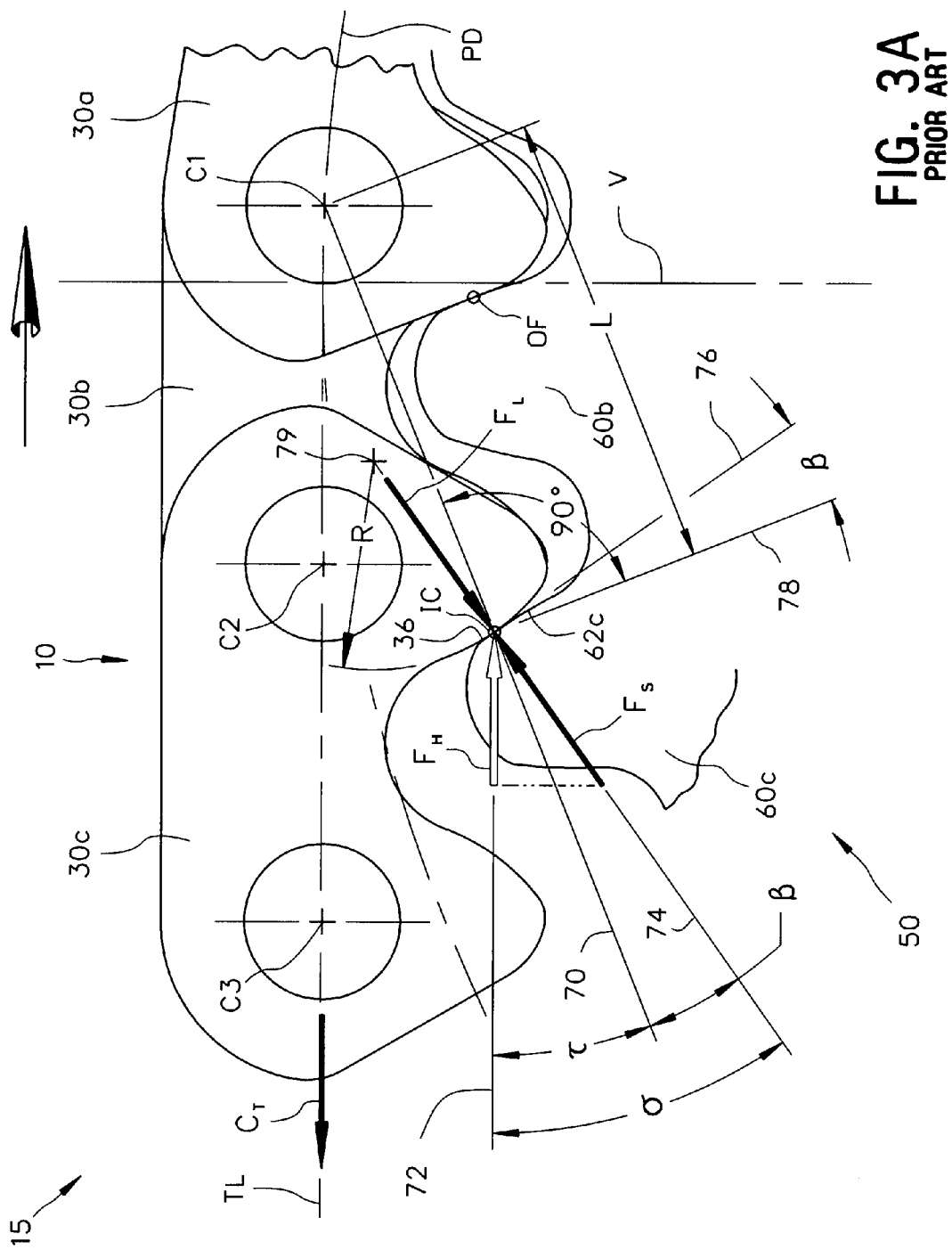
FIG. 3A is an enlarged portion of FIG. 3.

In FIG. 6A, the meshing impact angle Sigma (σ) and its constituents are shown relative to a reference line 172 that is parallel to the tangent line TL and that extends through the initial contact location IC, coincident with the force vector $F_H$. As shown in FIGS. 6 and 6A, unlike the prior art chain 10 of FIGS. 1 and 3, the shape of the link plates 130 of the chain 110 is designed to optimize initial meshing impact geometry at the initial contact location IC between a sprocket tooth 60c and a chain link row 130c at the leading inside flanks 136 of the link plates 130 as the sprocket tooth 60c collects the link row 130c from the chain span to reduce the link impact force $F_L$ and the resultant impact energy E. As such, the shape of the link plates 130 reduces noise and vibration levels associated with the chain-sprocket meshing phenomena. As further described below in relation to FIGS. 7 and 7A, the improved link plate form 130 also results in optimized meshing contact geometry for the subsequent transition to full chordal meshing contact OF at the trailing outside flanks 137 of a preceding link row 130b to complete the meshing process for the same tooth.

To design a link plate 130 in accordance with the present development, the inside flank 136 of link plate 130c is determined as a function of the desired initial contact location IC with a sprocket tooth 60c, and this is preferably established with a sprocket size (number of teeth) at or near the smallest tooth count for the family (range of tooth counts) of sprockets to be used with the chain 110 (for the system 115, the initial contact location IC will vary as tooth count varies). The outside flank 137 is already determined prior to this, however, since the trailing outside flank 137 of the closest fully meshed link row (in this case link row 130a) serves to position the meshing link rows 130b,130c, and the profile for the inside flank 136 of the link plate 130 can then be established at its initial meshing impact (initial contact) IC rotational position.

As noted above, the meshing impact angle σ, as illustrated in FIGS. 6,6A, is defined by the following equation:

$$\sigma = \tau + \beta$$

where τ is the link plate meshing contact angle and β is the link plate entrance angle at the onset of meshing impact. In that tooth impact reaction force $F_S$ will vary with the magnitude of the meshing impact angle σ for a constant chain tension $C_T$, there is a benefit for the meshing impact angle σ to be as small as practical when establishing the form of the inside flank 136.

Figure 5C:
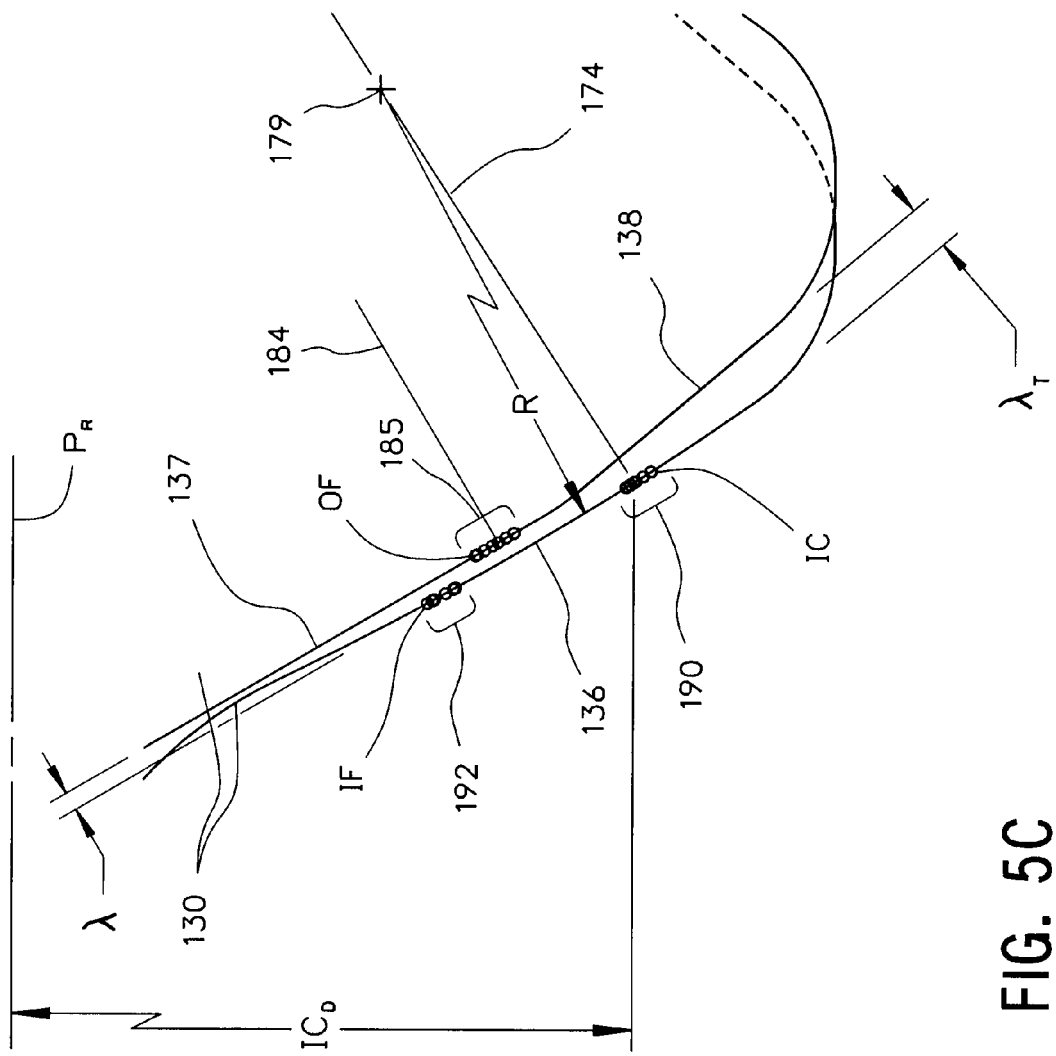
FIG. 5C shows detail region 5A of FIG. 5, and illustrates the locations on the link plates that make contact with an engaging flank of a sprocket tooth over a meshing cycle.

Referring still to FIG. 6A, a rotational position for the controlling pin center C1 and the meshing contact angle τ are selected to place the initial contact location IC in a desired region on the inside flank 136 that will serve to best satisfy the meshing geometry and link plate loading. As shown in FIG. 5C, for the illustrated chain with a pitch P=7.7 millimeters (mm) and the sprocket 50 defined with a mating chordal pitch, the initial contact location IC on the inside flank 136 is spaced at a desired initial contact distance $IC_D$ from a pin center reference line $P_R$ that extends between the pin centers C of the link plate (pin centers C2,C3 of FIGS. 6 & 6A), as measured normal to the pin center reference line $P_R$. This desired initial contact distance $IC_D$ is determined for a sprocket tooth count at or near the smallest tooth count for the family of sprockets 50 (range of tooth counts) to be used with chain 110. The optimal initial contact distance $IC_D$ for a given link plate is a function of the design of the link plate 130, in particular the inside flank 136, as disclosed herein. Also, for a conventional sprocket 50, $IC_D$ will vary as the tooth count of the sprocket 50 varies.

In order to control the meshing impact angle Sigma (σ) and its constituents for reduced noise and vibration when designing an inverted tooth chain in accordance with the present development, it has been deemed beneficial to determine the initial contact distance $IC_D$ as a function of chain pitch so that the following relationship will be preserved for all tooth counts of the sprocket 50 intended to mesh with the chain 110:

$$0.49\,P \leq IC_D \leq 0.53\,P.$$

Thus, for a system 115 in which the sprocket 50 and chain are designed for a chain pitch P=7.7 mm, $IC_D$ must be in the range of 3.773 mm to 4.081 mm. For a system 115 in which the sprocket 50 and chain are designed for a chain pitch P=6.35 mm, $IC_D$ must be in the range of 3.112 mm to 3.366 mm. In other cases, the chain pitch P can be a value between 7.7 mm and 6.35 mm, and the magnitude of the contact distance $IC_D$ will change accordingly while still satisfying the equation $0.49\,P \leq IC_D \leq 0.53\,P$ as shown in TABLE 2 below.

TABLE 2

| P (Pitch) | 0.49P ≤ $IC_D$ ≤ 0.53P | | | | | Factor |
|---|---|---|---|---|---|---|
| | 0.49 | 0.50 | 0.51 | 0.52 | 0.53 | |
| 7.70 | 3.773 | 3.850 | 3.93 | 4.004 | 4.081 | $IC_D$ |
| 7.40 | 3.626 | 3.700 | 3.77 | 3.848 | 3.922 | |
| 7.00 | 3.430 | 3.500 | 3.57 | 3.640 | 3.710 | |

TABLE 2-continued

| | 0.49P ≤ IC_D ≤ 0.53P | | | | | |
|---|---|---|---|---|---|---|
| P (Pitch) | 0.49 | 0.50 | 0.51 | 0.52 | 0.53 | Factor |
| 6.70 | 3.283 | 3.350 | 3.42 | 3.484 | 3.551 | |
| 6.35 | 3.112 | 3.175 | 3.24 | 3.302 | 3.366 | |

As shown in FIG. 6A, a reference line 176 is tangent to both the sprocket tooth engaging flank 62C and the link plate inside flank 136 at initial contact location IC. The inside flank reference line 174 is thus perpendicular the reference line 176 and will therefore be normal to the involute surface of the tooth flank 62C at the initial contact location IC. Reference line 178 is perpendicular to initial contact reference line 170. It follows that the magnitude of the link plate entrance angle Beta (β) will be a resultant of the meshing contact angle τ selection. The rotational position of the controlling pin center C1 and the meshing contact angle τ selection effectively define the link plate entrance angle β, and therefore also define the meshing impact angle σ. As graphically shown in FIG. 6A, meshing impact reaction force $F_S$ becomes a smaller value as the meshing impact angle σ is reduced. When defining the profile of the link plates 130, it is thus desirable to select a value for pin center C1 rotation, i.e., the rotational position of the controlling pin center C1, and meshing contact angle τ that will satisfy the following relationships:

$$\sigma = (\tau + \beta) \leq 34° \text{ at initial meshing impact IC where}$$

$$\beta \leq 9°$$

A system in which σ=(τ+β)≤34° and β≤9° at initial meshing impact IC will result in a reduction of the link impact force $F_L$ and the resultant impact energy E as compared to prior systems (as defined in the background above).

Figure 4:
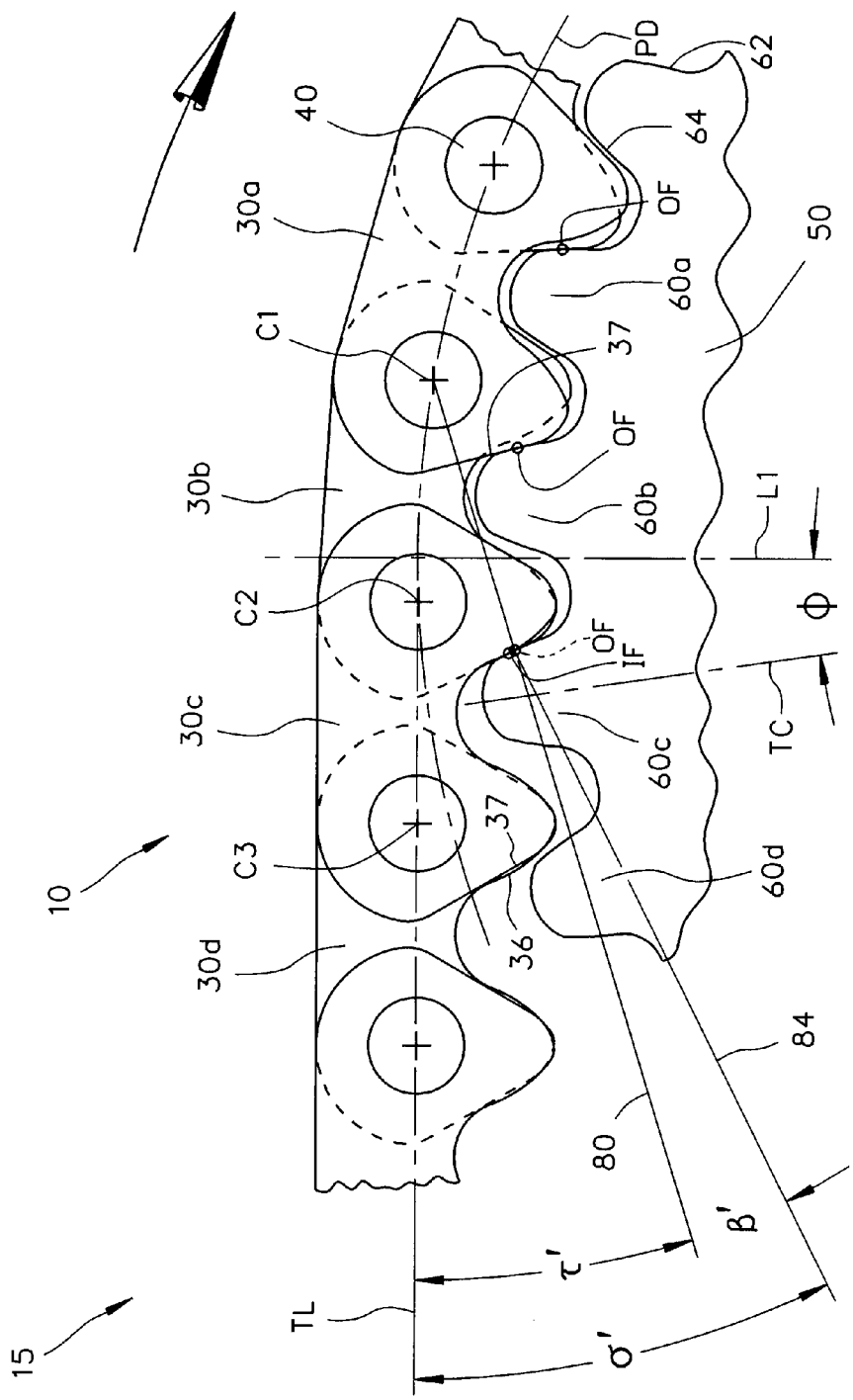
FIG. 4 shows the system of FIG. 3 wherein two consecutive link rows of the chain are in simultaneous meshing contact with a sprocket tooth.
Figure 4A:
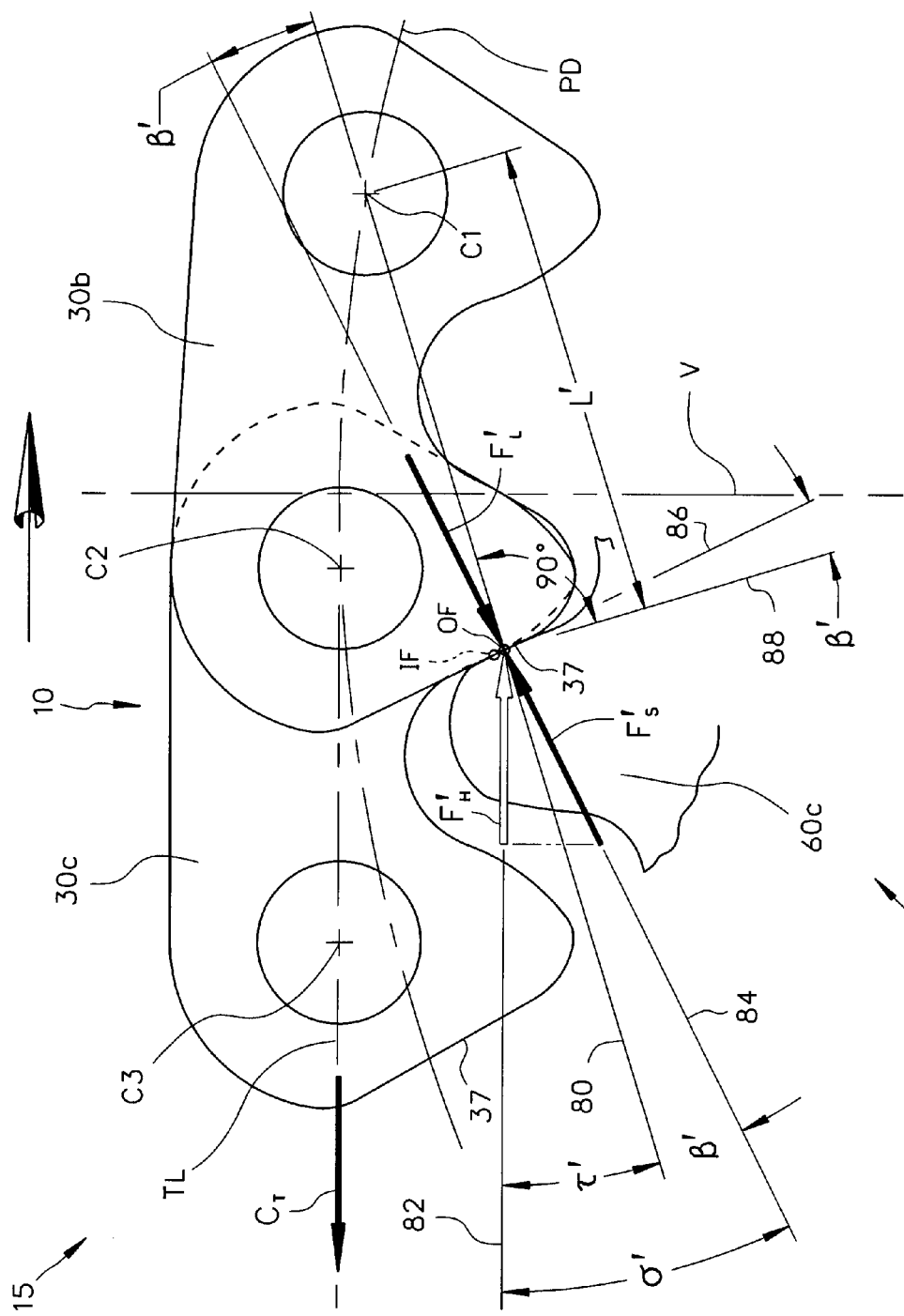
FIG. 4A is an enlarged partial view of FIG. 4 with a link plate in the foreground removed for clarity in order to more clearly show the simultaneous meshing contacts.
Figure 7:
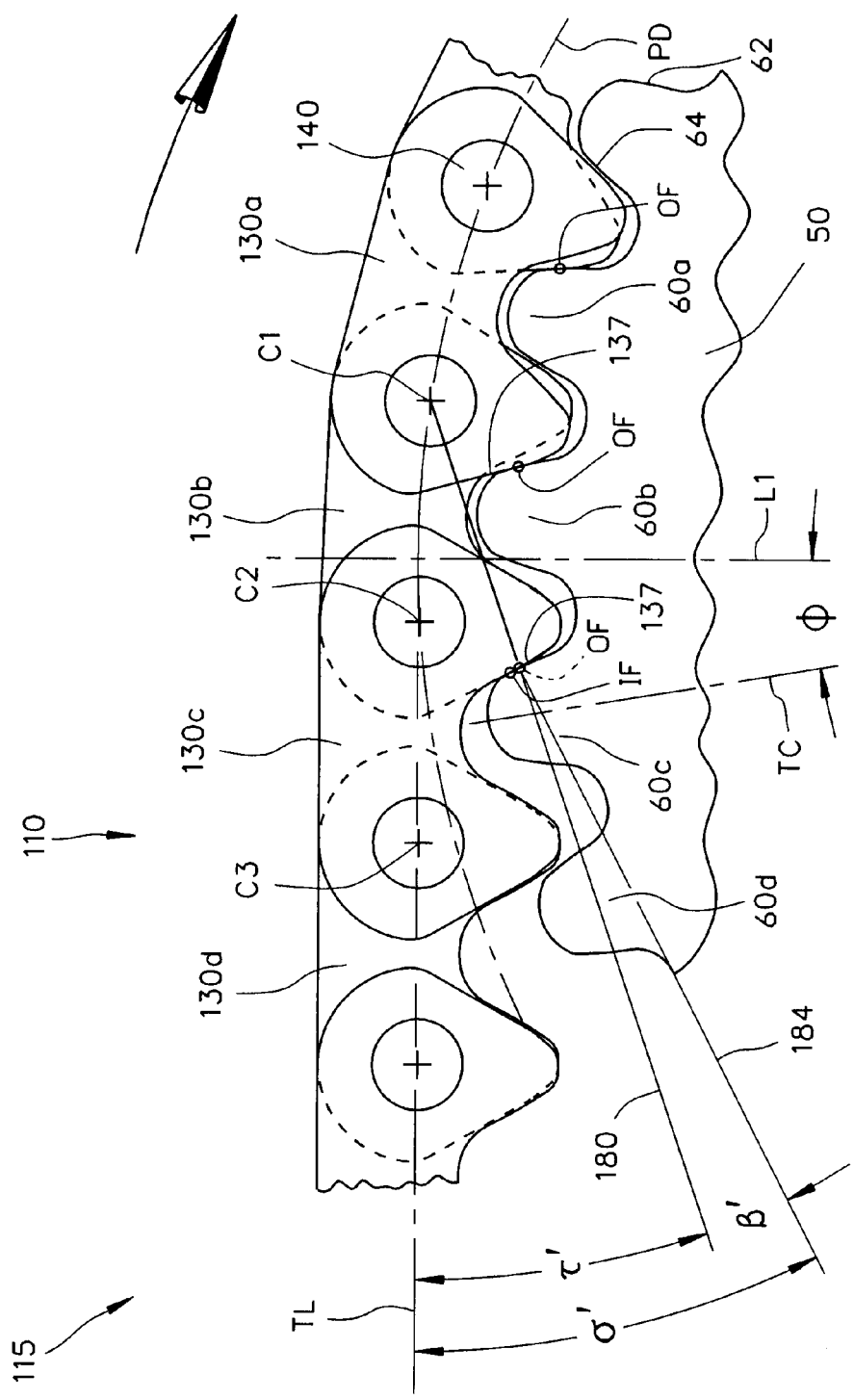
FIG. 7 shows the system of FIG. 6 wherein two consecutive link rows of the chain are in simultaneous meshing contact with a sprocket tooth.
Figure 7A:
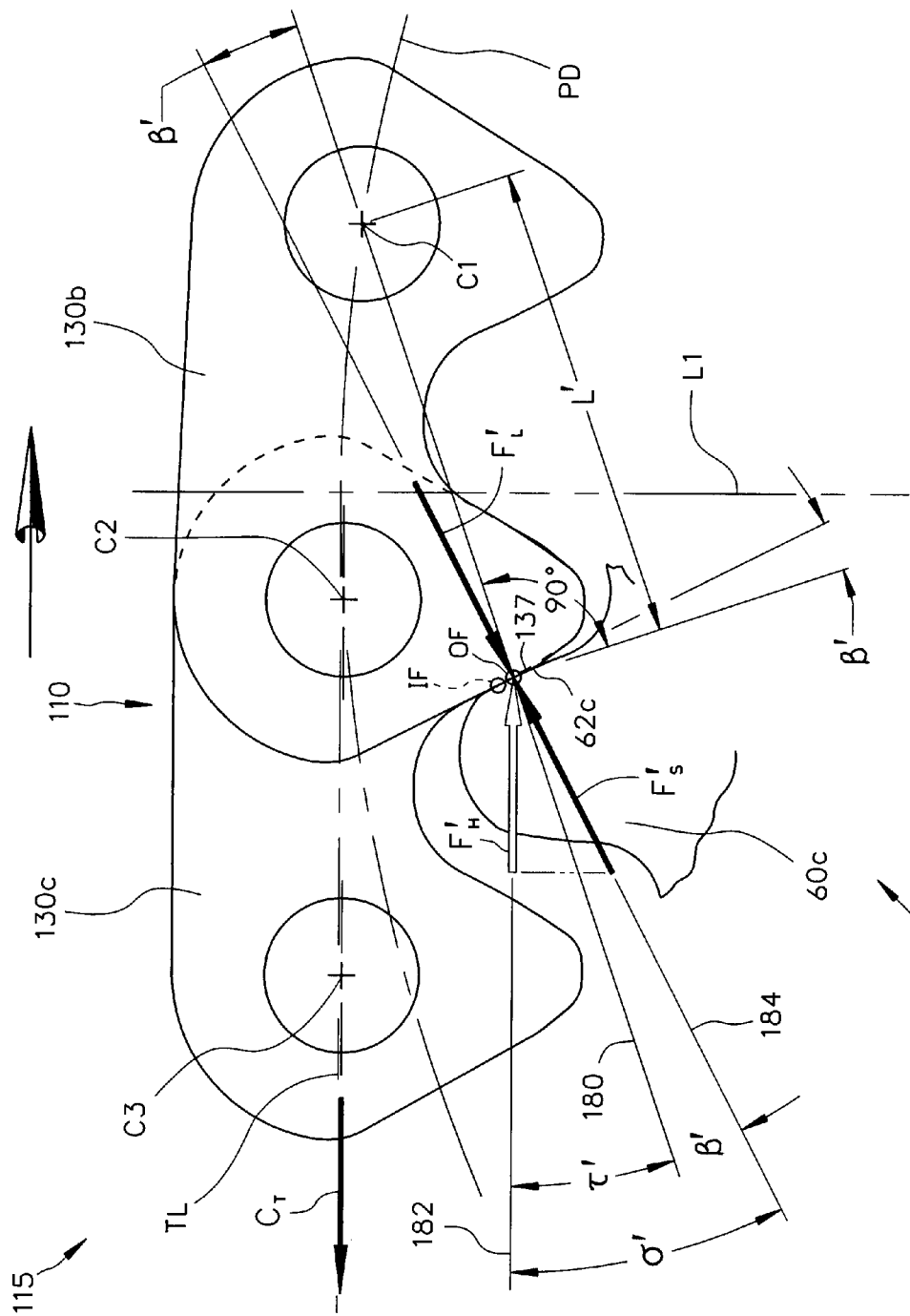
FIG. 7A is an enlarged partial view of FIG. 7 with a link plate in the foreground removed for clarity in order to more clearly show the simultaneous meshing contacts.

FIGS. 7 and 7A correspond respectively to FIGS. 4 and 4A, in that FIGS. 7 and 7A show simultaneous meshing contact for the chain 110. As such, FIG. 7 is similar to FIG. 6 but shows the sprocket 50 rotated further through the meshing cycle until the instant when the trailing outside flanks 137 of preceding link row 130b make contact with the engaging flank 62c of sprocket tooth 60c at an outside flank contact location OF while the leading inside flanks 136 of link row 130c are also contacting the engaging flank 62c at a location IF. As noted above, the instant at which the tooth 60c transitions from inside flank only contact with leading inside flanks 136 of link row 130c also to outside flank contact with trailing outside flanks 137 of preceding link row 130b at an outside flank contact point OF can be referred to as a transition point, and also defines the end of the meshing cycle for the tooth 60c, because the link row 130b is fully meshed with both its leading and trailing pin centers C1,C2 located on the pitch diameter PD. A transition angle Phi (φ) is defined between the first radial reference line L1 and the second radial reference line TC passing through the tooth center of tooth 60c.

FIG. 7A is an enlarged partial view of FIG. 7 and shows that:

a transition contact angle Tau' (τ') is defined between the tangent line TL and a transition contact reference line 180 that passes through both the outside flank contact location OF and the controlling pin center C1 which, for the transition phenomenon, is the leading pin center C of the link row transitioning to trailing outside flank contact at location OF with the tooth 60c;

the transition contact reference line 180 defines a length L' lever arm between the controlling pin center C1 and outside flank contact location OF;

a link plate transition angle Beta' (β') is defined between the transition contact reference line 180 and an outside flank reference line 184 that extends normal to the trailing outside flank 137 (the outside flank reference line 184 will also be normal to the involute curve (or radial arc segment or other curved surface) of the engaging flank 62c of the sprocket tooth 60c);

a transition impact angle Sigma' (σ') is defined between the tangent line TL and the outside flank reference line 184, wherein σ'=τ'+β'.

The resulting link plate transition angle Beta' (β') and transition impact angle Sigma' (σ') will dictate the link impact force $F'_L$ and resultant impact energy E for the transitional impact of the trailing outside flanks 137 at location OF. It should be noted that features in FIGS. 7 and 7A that correspond to features of FIGS. 6 and 6A are labeled with corresponding reference characters including a prime (') designation, and not all are discussed further. Also, in FIG. 7, the transition impact angle Sigma' (σ') and its constituents are shown relative to a reference line 182 that is parallel to the tangent line TL and extending through the outside flank contact location OF, coincident with the force vector $F'_H$. These transitional impacts of the trailing outside flanks 137 at locations OF are thought to be a less significant contributor of noise and vibration as compared to the above described initial meshing impacts of the leading inside flanks 136 at locations IC, but it is believed that controlling the transition impact angle Sigma' (σ') and its constituents, i.e., the link plate transition angle Beta' (β') and the transition contact angle Tau' (τ'), is desirable for further minimizing noise and vibration in the system 115.

Figure 8:
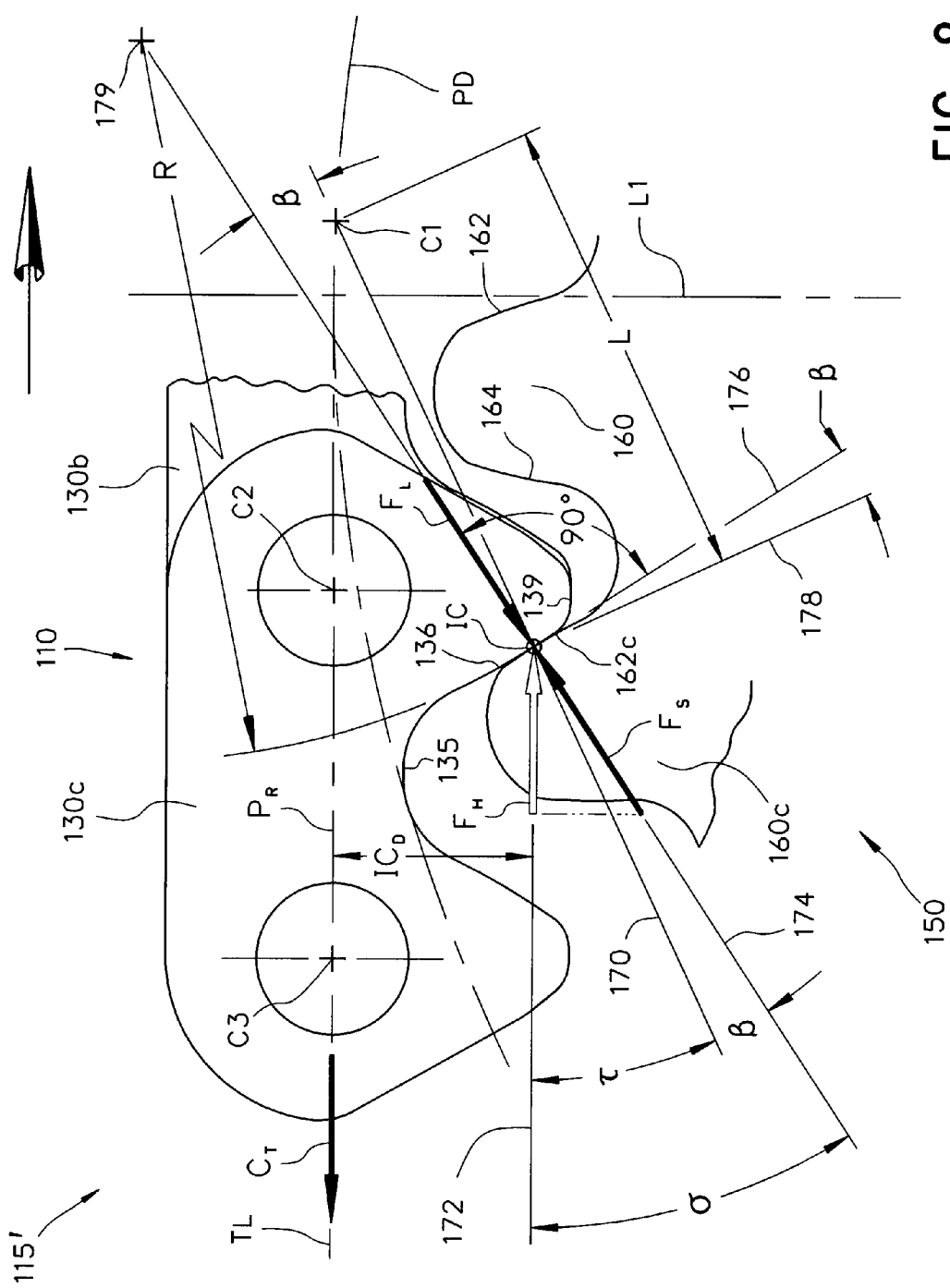
FIG. 8 is similar to FIG. 6A, but shows the chain of FIG. 5 at the onset of meshing with a sprocket tooth formed in accordance with an alternative embodiment of the present development, wherein the sprocket tooth pressure angle is adjusted relative to the known sprocket of FIG. 6.
Figure 9B:
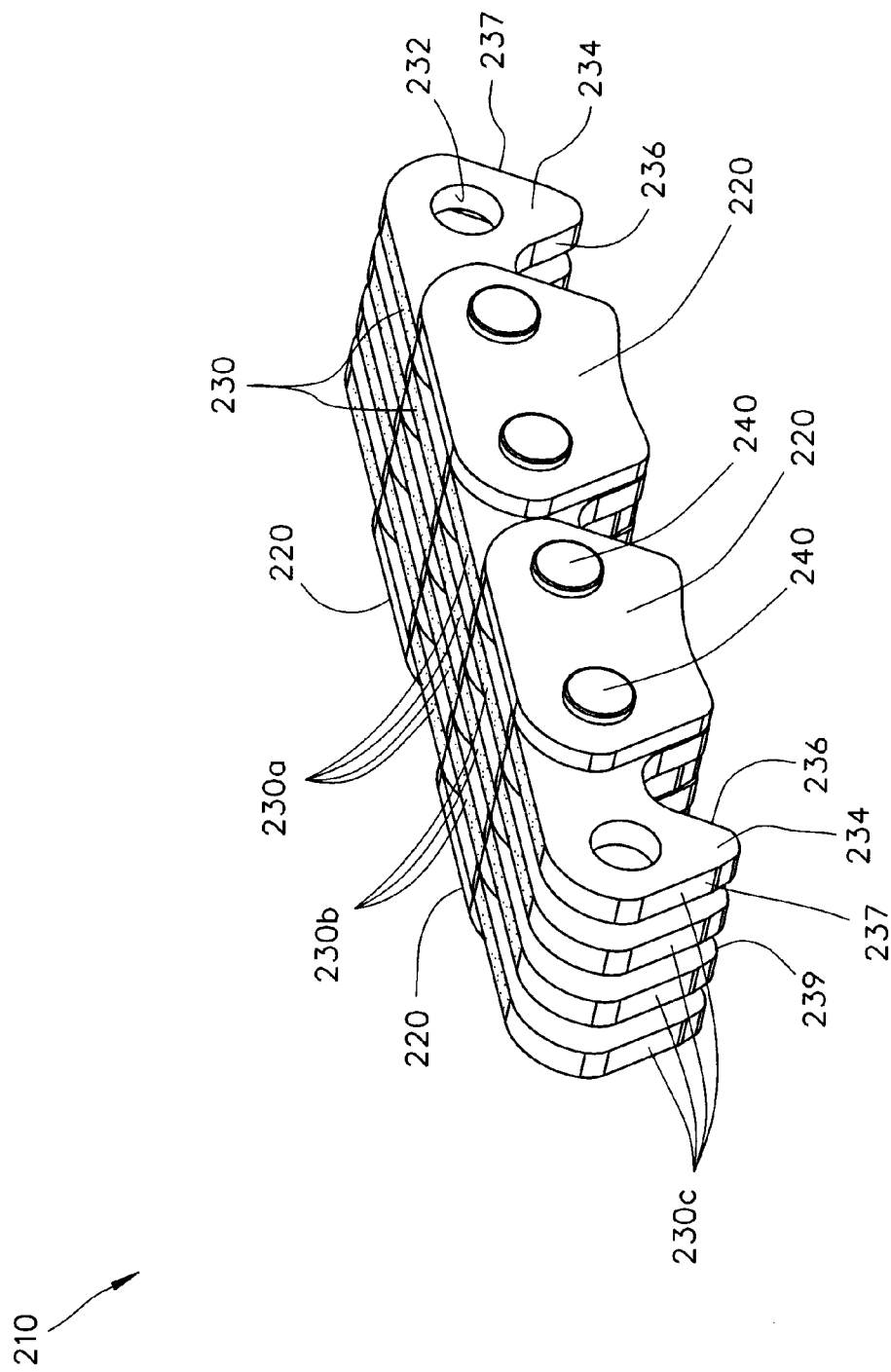
FIG. 9B is an isometric view of multiple link rows of the chain of FIG. 9 including guide plates.
Figure 9C:
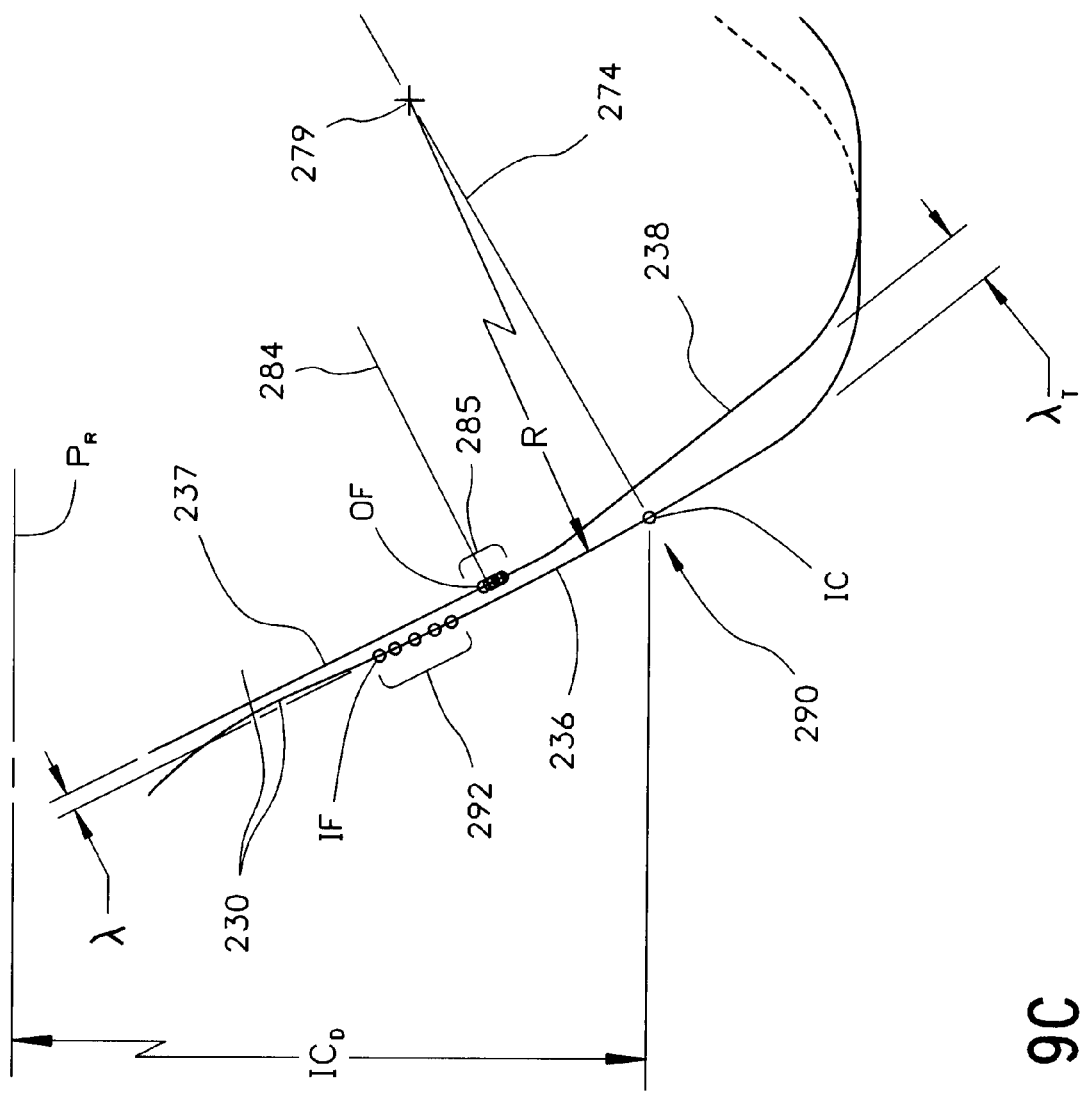
FIG. 9C shows detail region 9A of FIG. 9, and illustrates the locations on the chain that make contact with an engaging flank of a sprocket tooth over a meshing cycle.

The ability to control and optimize the meshing impact angle σ and transition impact angle σ' is limited when the chain 110 must mesh only with conventional sprockets such as the sprocket 50 having teeth defined with known pressure angles as defined in TABLE 1. According to an alternative embodiment of the present development, it has been determined that noise and vibration resulting from meshing the chain 110 with the conventional sprocket 50 can be further reduced by replacing at least one conventional sprocket 50 of the system 115 with a modified sprocket 150 to define a system 115' as shown in FIG. 8. FIG. 8 shows the link row 130c of the chain 110 at the onset of meshing with engaging flank 162c of the sprocket 150. Although not shown in FIG. 8, the link rows 130 of the chain 110 that are fully meshed with the sprocket 150 have their trailing outside flanks 137 in outside flank contact OF with respective engaging flanks 162 as described above in relation to FIG. 7A, i.e., the transition from inside flank contact IF to outside flank contact OF occurs for the system 115' in the same manner as the system 115. As above, the chain 110 is defined with a link pitch P≤7.7 mm and the modified sprocket 150 is defined with a corresponding pitch to mesh therewith. The system 115' is thus defined by the chain 110 meshed with a modified sprocket 150 and at least one other sprocket of the same or different tooth count and that is a conventional sprocket 50 or another modified sprocket 150. Features of the modified sprocket 150 that correspond to features of the conventional sprocket 50 are identified using reference numbers that are 100 greater than those used in connection with the conventional sprocket 50. The modified sprocket 150 is identical to the conventional sprocket 50, except that the teeth 160 of the modified sprocket 150 are defined to have a different pressure angle PA for each sprocket tooth count N. The sprocket tooth 160 pressure angle PA range is shown below in TABLE 3.

TABLE 3

| | Pitch Range: 6.35 mm to 7.7 mm | |
|---|---|---|
| Sprocket Tooth Count (N) | Sprocket 150 Pressure Angle (PA) | $IC_D$ (mm) (FIG. 8) |
| All Values of N | 30° ≤ PA ≤ 33.5° (Varies for each tooth count) | 0.49P ≤ $IC_D$ ≤ 0.53P |

The design intent of the system 115' is to obtain a desired specific initial contact distance $IC_D$ in the above-specified range of 0.49 P≤$IC_D$≤0.53 P, a desired specific meshing impact angle Sigma (σ)≤33°, and a desired specific link plate entrance angle Beta (β)≤9° for reduced noise and vibration. More particularly, using the sprocket 150 which has a tooth pressure angle PA that will vary for each tooth count N for a given pitch P, it is possible to design a system 115' in which $IC_D$, Sigma (σ), and Beta (β) remain constant for all tooth counts N for a given chain pitch P in the range of 6.35 mm to 7.7 mm for the family of sprockets 150 intended to be used with the chain 110 in the system 115', while still satisfying the relationships:

0.49 P≤$IC_D$≤0.53 P

Sigma (σ)≤33°

Beta (β)≤9°

As such, unlike the system 115 in which the pressure angle PA of the sprocket teeth 60 has a fixed value for all tooth counts within a particular tooth count range (see TABLE 1), the system 115' allows for achieving a desired or optimized meshing geometry by the use of the sprocket 150 (with its modified pressure angle PA for each tooth count) with the chain 110 and with at least one conventional sprocket 50 in a case where it is not practical to change the sprocket tooth form for one or more sprockets in the system.

TABLE 4 illustrates one example of a system 115' in which the sprocket tooth count N varies from 19 to 50, sprocket chordal pitch and chain pitch P=7.7 mm, λ=0.083 mm, and that satisfies the above-noted requirements for Beta (β) and Sigma (σ):

TABLE 4

| Pitch (P mm) | Teeth (N) | Pressure Angle (PA°) | Beta (β°) | Sigma (σ°) | Lambda (λ mm) | $IC_D$ mm (FIG. 8) |
|---|---|---|---|---|---|---|
| 7.7 | 19 | 32.81 | 8.69 | 32.37 | 0.083 | 3.93 |
| 7.7 | 23 | 31.96 | 8.69 | 32.37 | 0.083 | 3.93 |
| 7.7 | 25 | 31.70 | 8.69 | 32.37 | 0.083 | 3.93 |
| 7.7 | 30 | 31.22 | 8.69 | 32.37 | 0.083 | 3.93 |
| 7.7 | 46 | 30.52 | 8.69 | 32.37 | 0.083 | 3.93 |
| 7.7 | 50 | 30.43 | 8.69 | 32.37 | 0.083 | 3.93 |

Those of ordinary skill in the art will recognize that the ability to alter the sprocket tooth pressure angle PA in an IT chain system 115' enables Beta (β) and Sigma (σ) to be optimized (β≤9°; σ≤33°) for reduced impact energy E as described above while placing the initial contact location IC at a preferred location (defined by distance $IC_D$) on the inside flank 136. As noted above, when designing the chain 110, $IC_D$ is set to fall within the range of 0.49 P≤$IC_D$≤0.53 P (TABLE 4 above illustrates $IC_D$=3.93 mm, P=7.7 mm). Also, as reflected in TABLE 4 above, the ability to alter the sprocket 150 tooth pressure angle PA as tooth count N ranges from a minimum tooth count to a maximum tooth count for a given chain pitch P enables the meshing impact angle Sigma (σ), link plate entrance angle Beta (β), and the initial contact distance $IC_D$ to be held constant as the tooth count varies as shown above.

In the case where the system 115' also includes a conventional sprocket 50 meshed with the chain 110, the meshing dynamics of the chain 110 with the conventional sprocket 50 will be in accordance with system 115 disclosed above in relation to FIGS. 6-7A, while the portion of the system 115' where the chain 110 is meshed with a modified sprocket 150 will exhibit meshing dynamics as disclosed with reference to FIG. 8.

Figure 10:
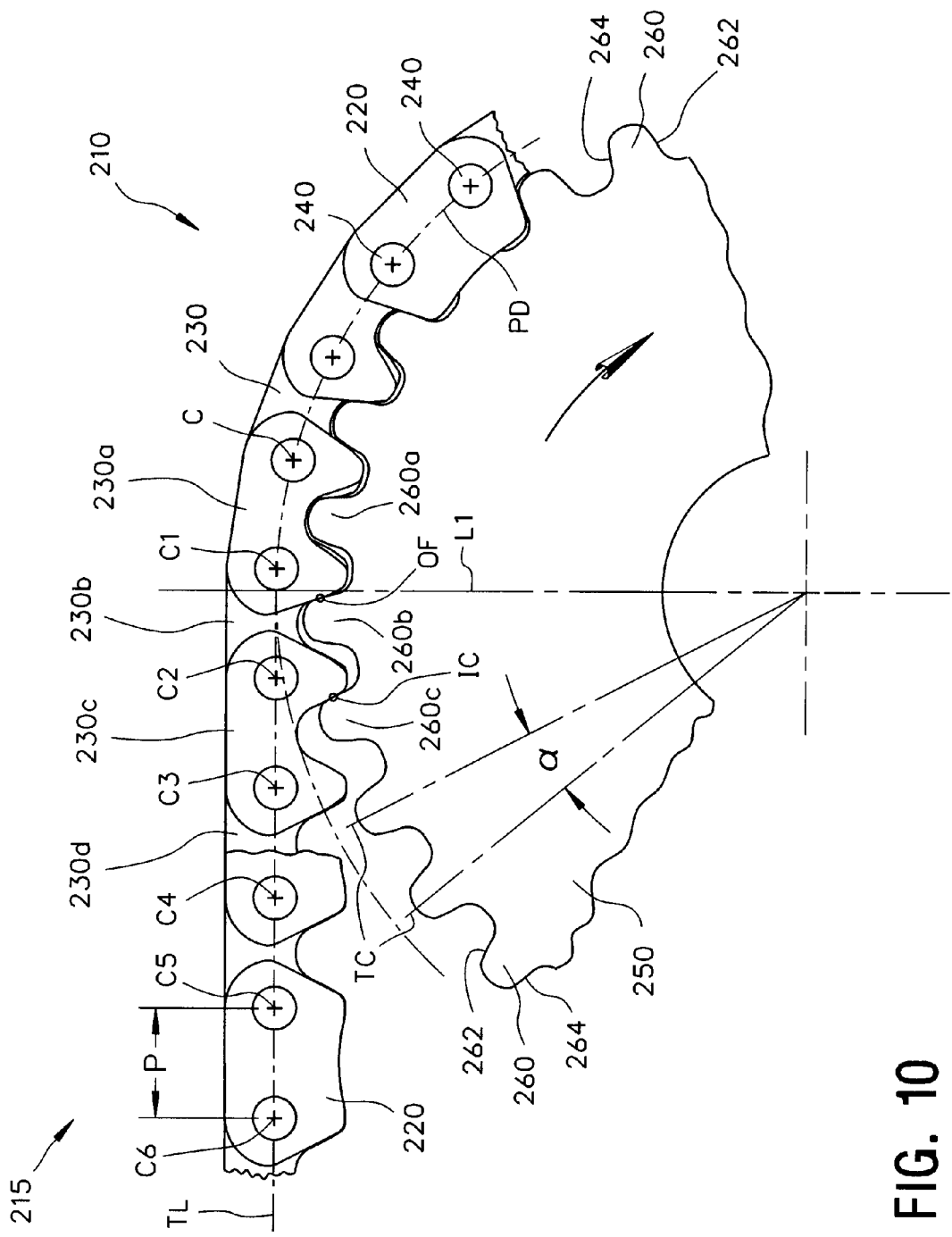
FIG. 10 shows the chain of FIG. 9 at the onset of meshing with a sprocket tooth having tooth flanks defined with reduced pressure angles in accordance with another aspect of the present invention.

According to another alternative embodiment of the present development, the chain 110 is replaced by a modified chain 210 as shown in FIGS. 9, 9A, 9B, 9C and the chain 210 is defined to mesh with a new, modified sprocket 250 formed in accordance with another alternative embodiment of the present development as shown in FIG. 10 to define a system 215. A chain and sprocket drive system 215 is defined by the chain 210 meshed with the sprocket 250 and at least one other sprocket defined according to the structure of the sprocket 250 (with the same or different tooth count). The chain 210 has a link pitch P that can vary from 6.35 mm to 7.7 mm, and the pitch of the sprocket 250 varies to match the chain 210.

Except as otherwise shown and described herein, the chain 210 shown in FIGS. 9, 9A, 9B, 9C is identical to the chain 110, and like components are labeled with reference numbers that are 100 greater than those used for the chain 110. The inside flanks 236 of the chain 210 have a convexly arcuate form and the inside flanks will preferably project outwardly relative to the outside flanks 237 of adjacent link rows by a projection amount Lambda (λ) to satisfy the relationship 0.007 P≤λ≤0.017 P where P is equal to the chain pitch length. The inside flank 236 is formed to satisfy the relationship:

P≤R<2 P where R is the radius of curvature of the inside flank 236 and P is the chain pitch length. Each inside flank 236 is defined by a radial arc segment defined by a radius R centered at an arc center 279 (FIG. 11A) and that extends from the crotch 235 to the tip 239.

Likewise, the sprocket 250 is identical to the sprocket 50 except as otherwise shown or described herein, and like features are labeled with reference numbers that are 200 greater than those used for the sprocket 50. The sprocket 250 includes teeth 260 (260a,260b,260c,etc.) defined with a pressure angle PA that is smaller than the conventional pressure angle as shown in TABLE 1 for the known sprocket 50 and also smaller than the adjusted pressure angles PA of the sprocket 150 as shown in TABLE 3, with the result being an increased steepness of the engaging flanks 262 (262a,262b,262c,etc.) as compared to the engaging flanks 62,162 of the respective sprockets 50,150. The pressure angle range for the sprocket 250 is shown in TABLE 5 that follows:

TABLE 5

| | Pitch Range: 6.35 mm to 7.7 mm | |
|---|---|---|
| Sprocket Tooth Count (N) | Sprocket 250 Pressure Angle | $IC_D$ (mm) (FIGS. 9C, 11A) |
| All Values of N | 27° ≤ PA ≤ 31.5° (varies for each tooth count) | 0.49P ≤ $IC_D$ ≤ 0.53P |

FIG. 10A shows a tooth 260c of the sprocket 250 in solid lines, including an engaging flank 262c and disengaging flank 264c symmetrically defined about the tooth center TC. The tooth 60c of the conventional sprocket 50 is shown overlaid in phantom lines. It can be seen that the tooth flanks 262c,264c defined with the smaller pressure angle are much steeper as compared to the tooth flanks 62c,64c defined with the conventional pressure angle. The reference lines 76 and 176 are respectively tangent to the engaging flank 62c at initial contact locations $IC_{10}$,$IC_{110}$, with the initial contact location $IC_{10}$ representing the initial contact location for the chain 10 and the initial contact location $IC_{110}$ representing the initial contact location for the chain 110. The reference line 276 is tangent to the engaging flank 262c at initial contact location $IC_{210}$ where the leading inside flanks 236 of a meshing link row 230 of chain 210 make initial meshing contact with the engaging flank 262c. The reference line 276 defines a smaller angle with the tooth center reference line TC as compared to the angle defined between the reference line 176 and the tooth center reference line TC, which results from the smaller pressure angle of the engaging flank 262c.

Figure 11:
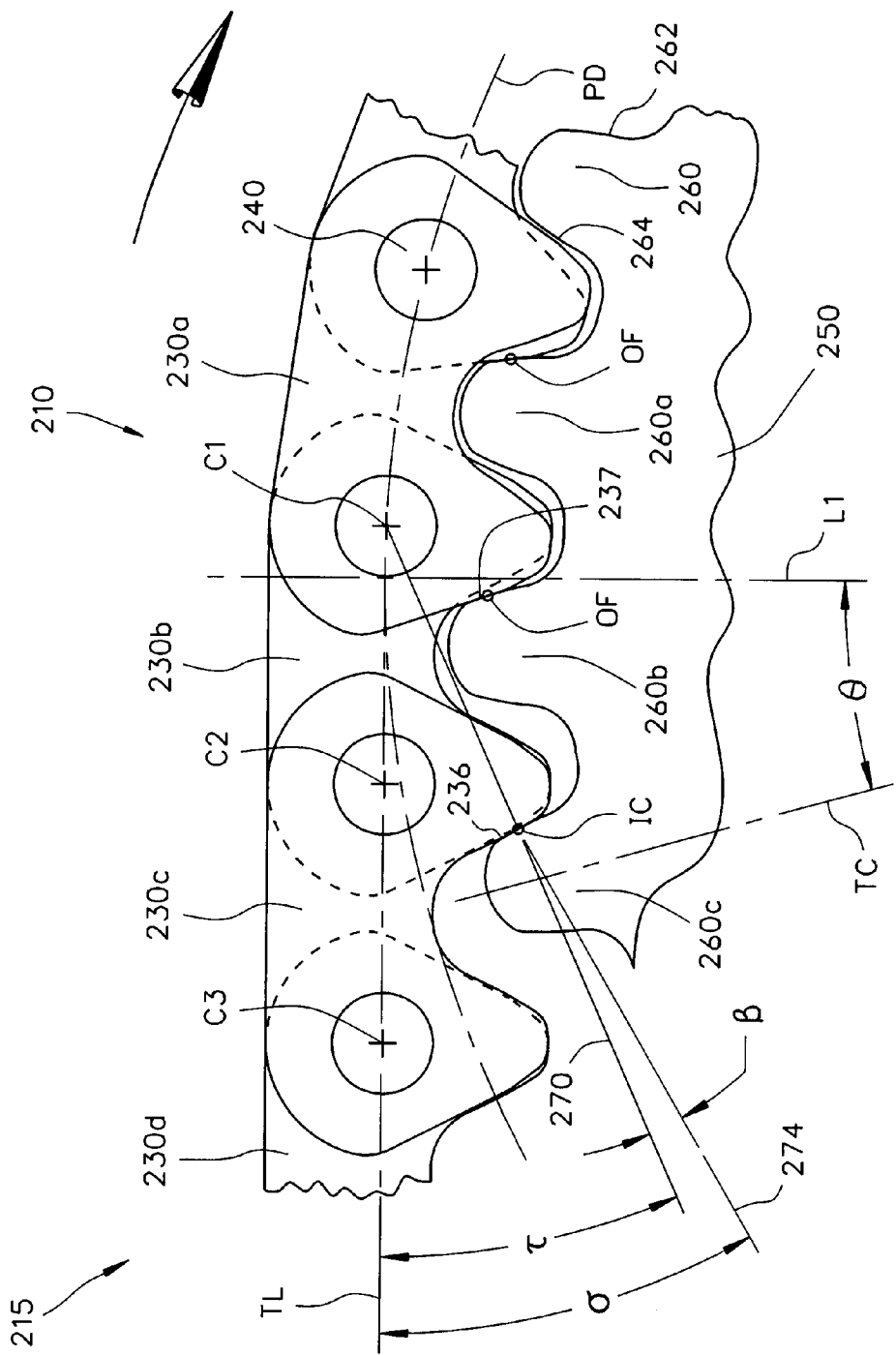
FIG. 11 is an enlarged portion of FIG. 10 and shows the chain of FIG. 9 with a link row at the onset of meshing with a sprocket tooth.
Figure 11A:
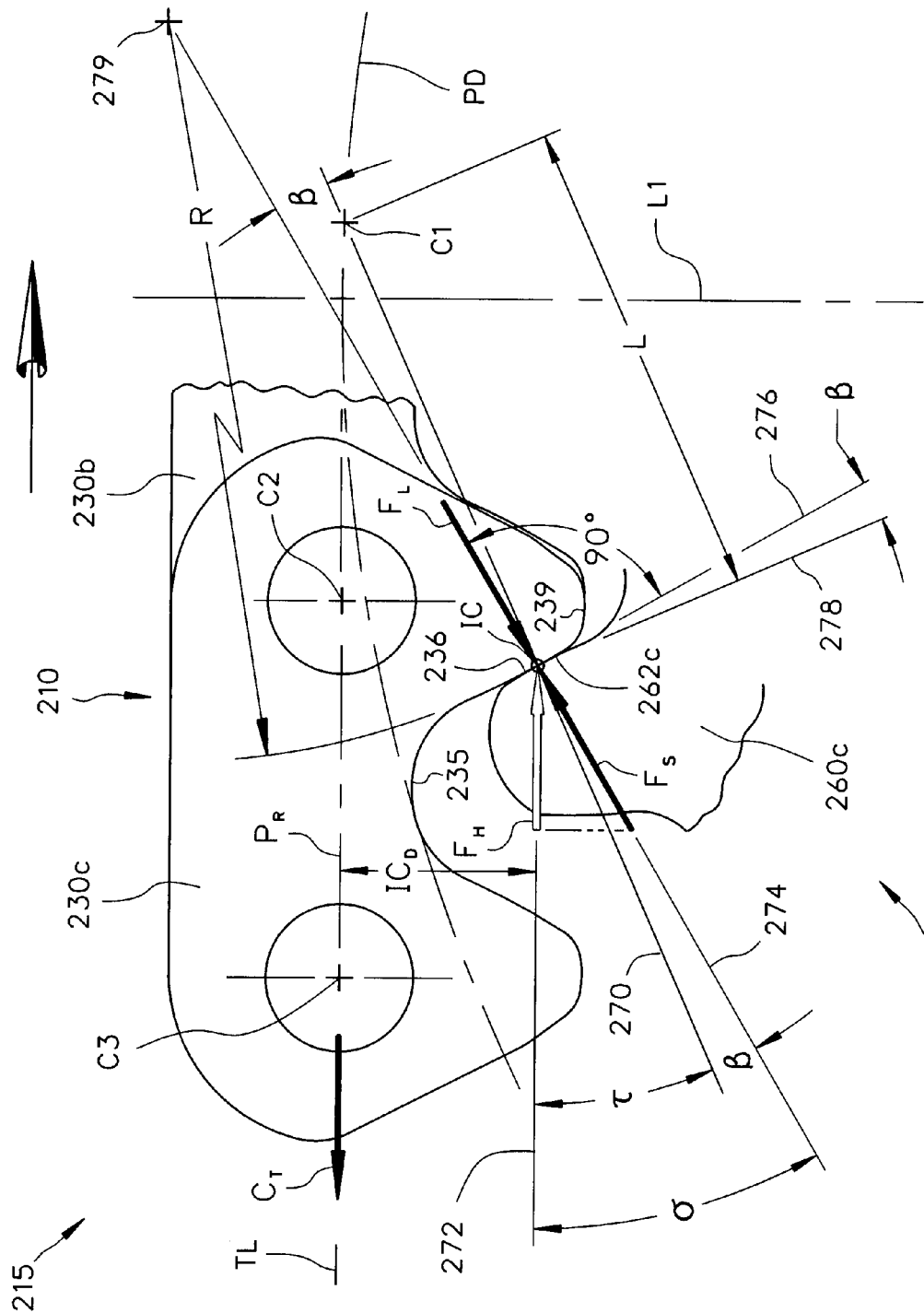
FIG. 11A is an enlarged portion of FIG. 11.
Figure 12:
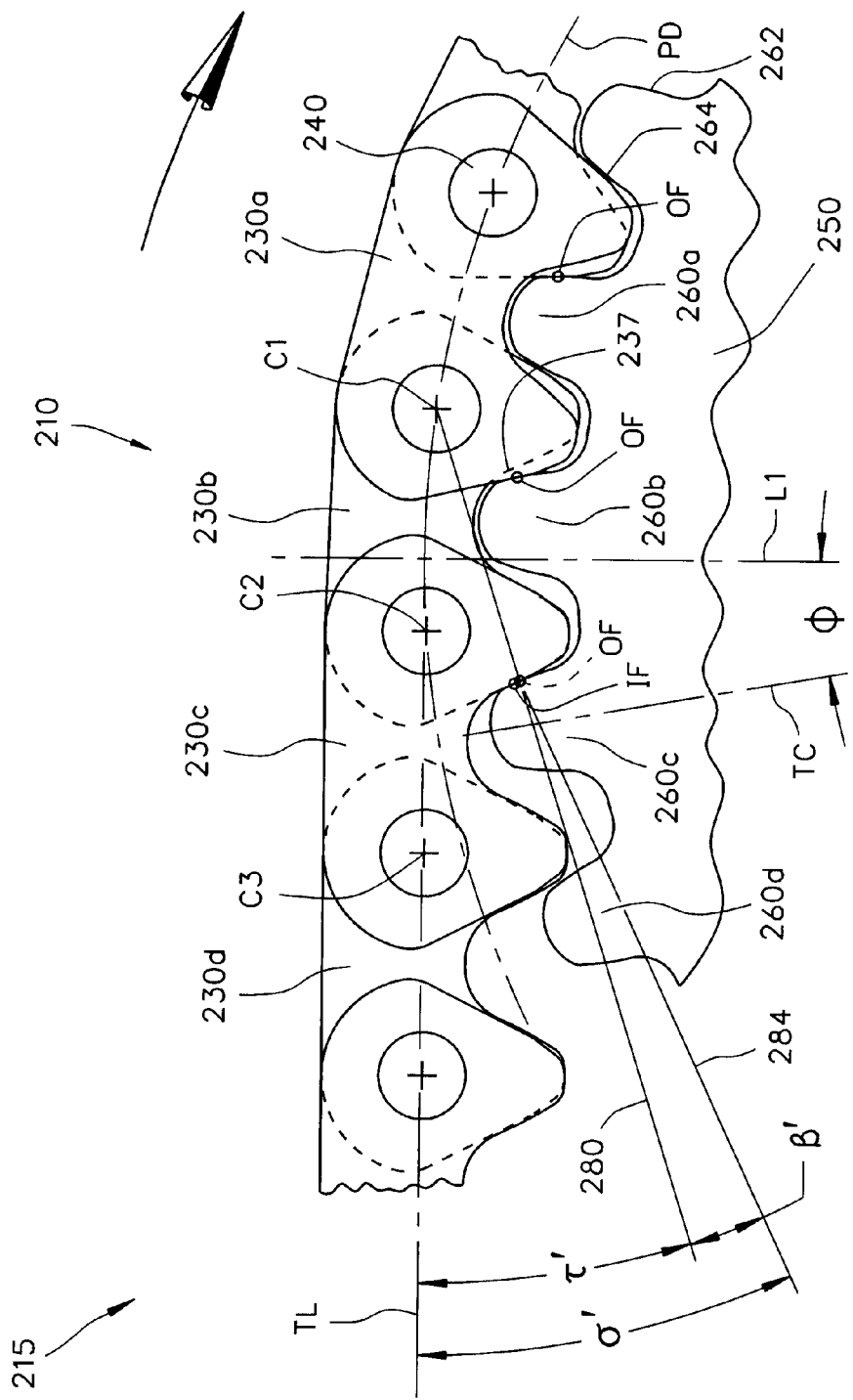
FIG. 12 shows the system of FIG. 11 wherein two consecutive link rows of the chain are in simultaneous meshing contact with a sprocket tooth.
Figure 12A:
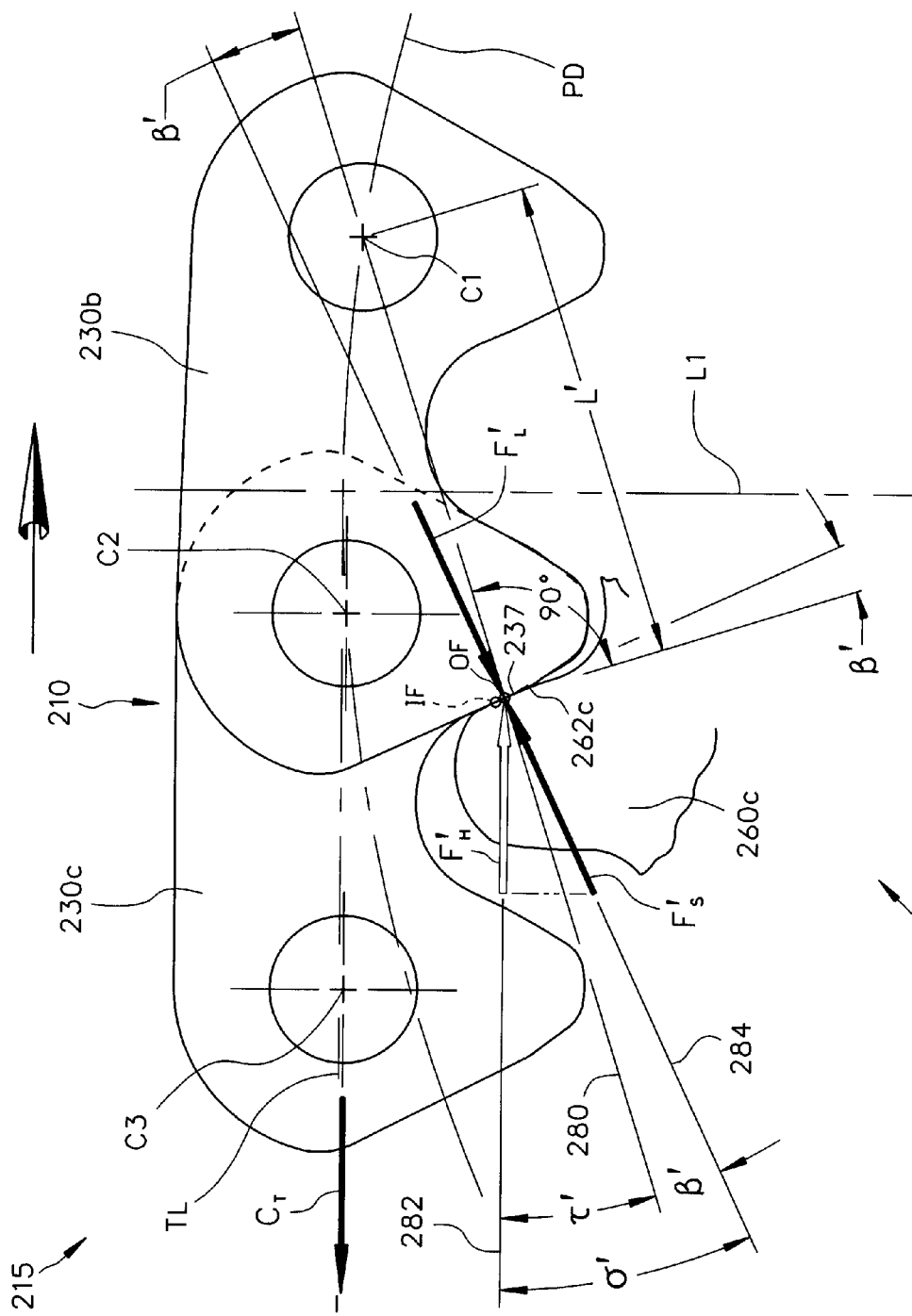
FIG. 12A is an enlarged partial view of FIG. 12 with a link plate in the foreground removed for clarity in order to more clearly show the simultaneous meshing contacts.

FIGS. 11 and 11A correspond respectively to FIGS. 6 and 6A, and FIGS. 12 and 12A correspond respectively to FIGS. 7 and 7A, except that the chain 210 and sprocket 250 are shown instead of the chain 110 and sprocket 50. As such, further explanation of FIGS. 11, 11A, 12, 12A is not provided here, except to note that by decreasing the sprocket tooth pressure angle PA and correspondingly decreasing the outside flank angle outside flank angle ψ, the meshing impact angle Sigma (σ) and transition impact angle Sigma' (σ') for the chain 210 meshing with the sprocket 250 are both desirably reduced as compared to the meshing impact angle Sigma (σ) and transition impact angle Sigma' (σ') for the chain 110 meshing with the conventional sprocket 50 or a modified sprocket 150. Accordingly, impact energy E and tooth impact reaction force $F_S$ will be further reduced as compared to the system 115 that uses a conventional sprocket 50 and the system 115' that uses a modified sprocket 150.

In particular, for the sprocket 250 with modified pressure angles, the meshing impact angle σ can be controlled for additional noise and vibration improvement as follows:

$$\sigma = (\tau + \beta) \leq 31° \text{ (for inside flank initial meshing contact IC)}$$

where β≤7°. In such case, the outside flank angle ψ must also be reduced such that:

$$\psi \leq 27°$$

in order for the chain 210 to mesh properly with the sprocket 250. This will lead to a reduced transition impact angle σ'=(τ'+β')≤26° (for transition to outside flank full meshing contact OF) and where β'≤8.5°. Therefore, with the system 215 (as contrasted with system 115,115'), the desired or optimized meshing geometry in terms of $IC_D$, Sigma (σ), and Beta (β) is achieved by further modifying both the chain link plate form (link plate 230) and the sprocket tooth pressure angle PA (sprocket teeth 260) as described above and as further described below.

TABLE 6 provides additional data for the resulting meshing impact angle Sigma (σ) and link plate entrance angle Beta (β) for the systems 15, 115, 115', and 215 disclosed above:

TABLE 6

Pitch Range: 6.35 mm to 7.7 mm

| Chain Drive System | Max Sigma (σ) | Max Beta (β) | Psi (ψ) |
|---|---|---|---|
| System 15, Prior Art (FIG. 3) | 37° | 15° | 30° |
| System 115 (FIG. 6) | 34° | 9° | 30° < ψ ≤ 30.5° |
| System 115' (FIG. 8) | 33° | 9° | 30° < ψ ≤ 30.5° |
| System 215 (FIG. 10) | 31° | 7° | ≤27° |

Referring back to FIG. 9C, a greatly enlarged portion of the chain 210 is shown, including the leading inside flanks 236 of a link row and the trailing outside flanks 237 of a preceding link row. For the chain 210 meshing with the sprocket 250, the initial contact location IC will be located on the leading inside flanks 236 at a distance $IC_D$ from a pin center reference line $P_R$ that extends between the pin centers C of the link plate 230, as measured normal to the pin center reference line $P_R$. The outside flank contact location OF and inside flank transitional contact location IF will vary depending upon the sprocket tooth count N and pressure angle given that the chain 210 is designed to mesh with a family of sprockets 250 having tooth counts N between a minimum tooth count and a maximum tooth count intended to mesh with the chain 210.

TABLE 7 illustrates one example of a system 215 in which the sprocket tooth count N varies from 19 to 50, sprocket chordal pitch and chain pitch P=7.7 mm, λ=0.075 mm, and that satisfies the above-noted requirements for Beta (β) and Sigma (σ):

TABLE 7

| Pitch (P mm) | Teeth (N) | Pressure Angle (PA°) | Beta (β°) | Sigma (σ°) | Lambda (λ mm) | $IC_D$ mm (FIG. 11A) |
|---|---|---|---|---|---|---|
| 7.7 | 19 | 31.00 | 6.25 | 29.75 | 0.075 | 3.93 |
| 7.7 | 23 | 29.91 | 6.25 | 29.75 | 0.075 | 3.93 |
| 7.7 | 25 | 29.54 | 6.25 | 29.75 | 0.075 | 3.93 |
| 7.7 | 30 | 28.88 | 6.25 | 29.75 | 0.075 | 3.93 |
| 7.7 | 46 | 27.86 | 6.25 | 29.75 | 0.075 | 3.93 |
| 7.7 | 50 | 27.73 | 6.25 | 29.75 | 0.075 | 3.93 |

Those of ordinary skill in the art will recognize that the ability to alter the sprocket tooth pressure angle PA in an IT chain system 215 enables Beta (β) and Sigma (σ) to be optimized (β≤7°; σ≤31°) for reduced impact energy E as described above while placing the initial contact location IC at a preferred location (defined by distance $IC_D$) on the inside flank 236. As noted above, when designing the chain 210, $IC_D$ is set to fall within the range of 0.49 P≤$IC_D$≤0.53 P (TABLE 7 above illustrates $IC_D$=3.93 mm, P=7.7 mm). Also, as reflected in TABLE 7 above, the ability to alter the sprocket 250 tooth pressure angle PA as tooth count N ranges from a minimum tooth count to a maximum tooth count for a given chain pitch P enables the meshing impact angle Sigma (σ), link plate entrance angle Beta (β), and the initial contact distance $IC_D$ to be held constant as the tooth count varies.

Figure 13:
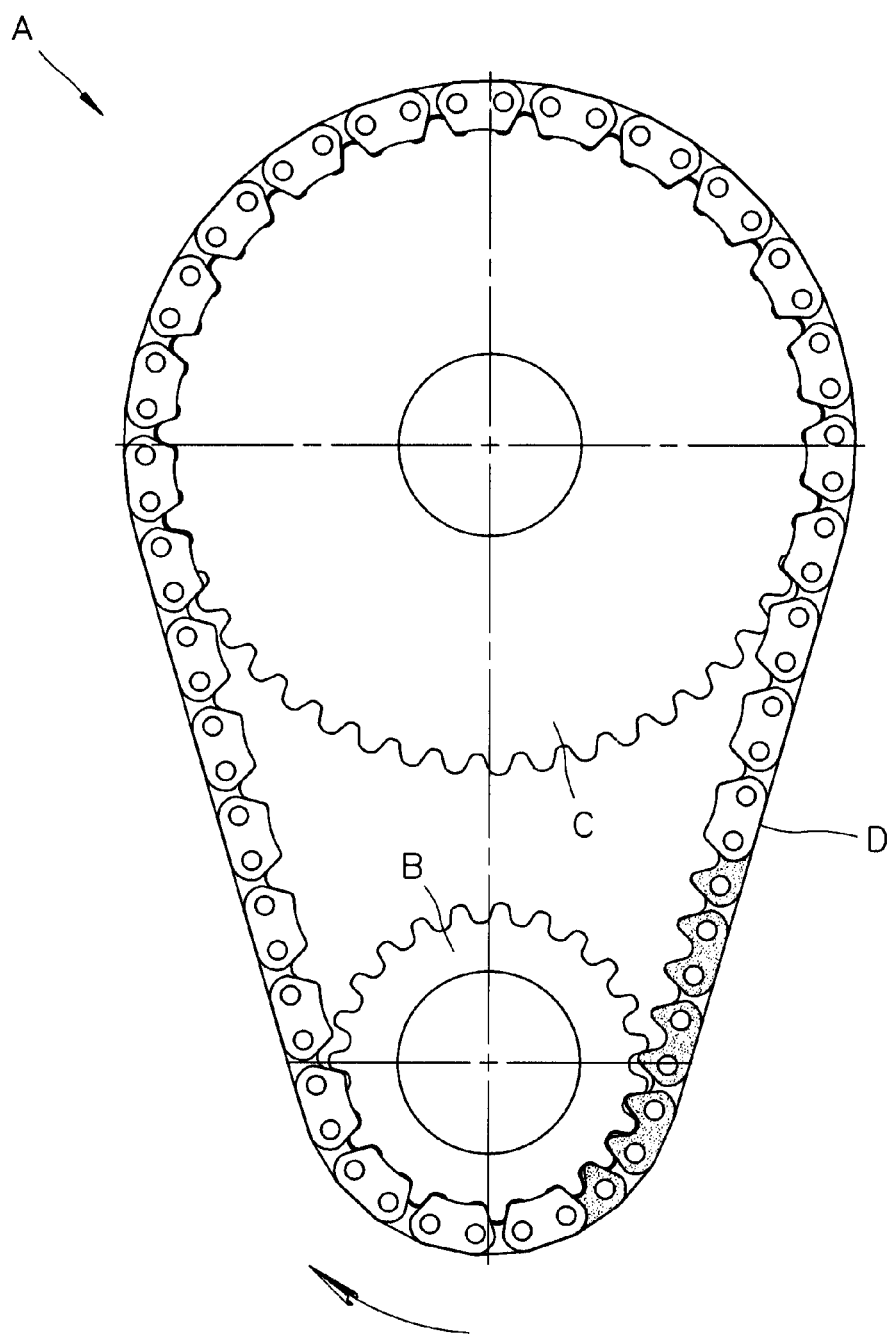
FIG. 13 shows an inverted tooth chain drive system in accordance with the present development.

FIG. 13 shows an inverted tooth chain system A formed in accordance with the present development, with some of the guide plates removed to reveal the underlying link plates. The system A comprises a first sprocket B, a second sprocket C, and an inverted tooth chain D meshed with both the first and second sprockets B,C for transmitting torque from one of the sprockets B,C to the other sprocket B,C. As shown, sprocket B is a drive sprocket such as a crankshaft sprocket and sprocket C is a driven sprocket such as a camshaft sprocket or other driven sprocket. As shown, sprocket B has a tooth count N and sprocket C has a tooth count 2N, but the tooth counts could be equal or otherwise unequal. TABLE 8 summarizes the possible combinations that can be achieved in accordance with the present development:

TABLE 8

| System A | Sprocket B | Sprocket C | Chain D |
|---|---|---|---|
| System 115 | 50 | 50 | 110 |
| System 115' | 50 | 150 | 110 |
| System 115' | 150 | 50 | 110 |
| System 115' | 150 | 150 | 110 |
| System 215 | 250 | 250 | 210 |

It should be noted that in the systems A where both the sprocket B and the sprocket C are sprockets 150 (TABLE 8, Row 4, System 115') or both the sprocket B and the sprocket C are sprockets 250 (TABLE 8, Row 5, System 215), the meshing impact angle Sigma (σ), the link plate entrance angle Beta (β), and the initial contact distance $IC_D$ defined between the chain and the sprocket will be equal with respect to both sprockets B,C even if the sprockets have different tooth counts, for all tooth counts in the range of possible tooth counts for the system 115',215. This ensures that the meshing impact angle Sigma (σ), the link plate entrance angle Beta (β), and the initial contact distance $IC_D$ can be optimized and controlled for both sprockets B,C when both sprockets B,C are provided as sprockets 150 or sprockets 250.

The development has been described with reference to preferred embodiments. Those of ordinary skill in the art will recognize that modifications and alterations to the preferred embodiments are possible. The disclosed preferred embodiments are not intended to limit the scope of the following claims, which are to be construed as broadly as possible, whether literally or according to the doctrine of equivalents.

The invention claimed is:

1. A chain and sprocket drive system comprising:
a sprocket comprising a plurality of teeth, wherein each tooth comprises an engaging flank and a disengaging flank;
an inverted tooth chain meshed with the sprocket, said inverted tooth chain comprising a plurality of rows of links that each articulate relative to a preceding link row about a leading pin center and that each articulate relative to a following link row about a trailing pin center, wherein said leading and trailing pin centers are spaced from each other at a chain pitch P, each of said rows comprising leading inside flanks and trailing outside flanks, wherein:
the leading inside flanks of each row project outwardly relative to a working portion of the trailing outside flanks of a preceding row and comprise an inside flank radius R;
said chain approaches said sprocket along a tangent line and the engaging flank of each sprocket tooth makes initial meshing contact with said chain at an initial contact location on the leading inside flanks of a meshing row of said chain at an instant of initial meshing contact;
at said instant of initial meshing contact, a chain row immediately preceding the meshing row includes a leading pin center that is located on a pitch diameter of the sprocket so as to be a controlling pin center;
for each row of said chain that is fully meshed with said sprocket, its leading and trailing pin centers are located on the pitch diameter PD and its trailing outside flanks are in contact with one of said engaging flanks;
a meshing contact angle Tau (τ) is defined between the tangent line TL and an initial contact reference line that passes through both the controlling pin center and the initial contact location;
a link plate entrance angle Beta (β) is defined between the initial contact reference line and an inside flank reference line that passes through an arc center of the inside flank radius and the initial contact location;
a meshing impact angle Sigma (σ) is defined between the tangent line and the inside flank reference line such that σ=τ+β, and σ≤34°;
said initial contact location is spaced by an initial contact distance $IC_D$ from a pin center reference line that extends between the leading and trailing pin centers of the meshing link row, wherein 0.49 P≤$IC_D$≤0.53 P.

2. The chain and sprocket drive system as set forth in claim 1, wherein Beta (β) is less than or equal to 9°.

3. The chain and sprocket drive system as set forth in claim 1, wherein the leading inside flanks of each row project outwardly relative to a working portion of the trailing outside flanks of a preceding row by a maximum projection amount Lambda (λ) such that 0.007 P≤λ≤0.017 P.

4. The chain and sprocket drive system as set forth in claim 3, wherein said flank radius has a magnitude defined such that P≤R<2P.

5. The chain and sprocket drive system as set forth in claim 4, wherein each of said inside links of said chain defines an outer flank angle 30°<ψ≤30.5° wherein said outer flank angle ψ is defined between a first reference line that includes said trailing pin center and that lies perpendicular to said tangent line and a second reference line that is coincident with said trailing outside flank.

6. The chain and sprocket drive system as set forth in claim 3, wherein said outside flank comprises a non-working portion comprising a chamfer located between the working portion and a toe tip for each of said inside links of said chain, wherein the leading inside flanks of an adjacent row of said chain project outwardly relative to the chamfer by a projection amount that is greater than said projection amount Lambda (λ) when said inverted tooth chain is pulled straight.

7. The chain and sprocket drive system as set forth in claim 6, wherein said working portion and said chamfer are both flat such that a chamfer angle is defined between said chamfer and a plane of a remainder of said trailing outside flank for each of said inside links.

8. The chain and sprocket drive system as set forth in claim 1, wherein said engaging flank of each sprocket tooth is defined with a pressure angle PA, wherein 30°≤PA≤33.5° and wherein Sigma (σ) is less than or equal to 33°.

9. The chain and sprocket drive system as set forth in claim 1, wherein said engaging flank of each sprocket tooth is defined with a pressure angle PA, wherein 27°≤PA≤31.5°.

10. The chain and sprocket drive system as set forth in claim 9, wherein Sigma (σ) is less than or equal to 31°.

11. The chain and sprocket drive system as set forth in claim 10, wherein Beta (β) is less than or equal to 7°.

12. The chain and sprocket drive system as set forth in claim 11, wherein the leading inside flanks of each row project outwardly relative to a working portion of the trailing outside flanks of a preceding row by a maximum projection amount Lambda (λ) such that 0.007 P≤λ≤0.017 P.

13. The chain and sprocket drive system as set forth in claim 12, wherein said flank radius R is defined such that P≤R<2P.

14. The chain and sprocket drive system as set forth in claim 13, wherein each of said inside links of said chain defines an outer flank angle ψ≤27°, wherein said outer flank angle ψ is defined between a first reference line that includes said trailing pin center and that lies perpendicular to said tangent line and a second reference line that is coincident with said trailing outside flank.

15. The chain and sprocket drive system as set forth in claim 14, wherein said outside flank further comprises a non-working portion including a chamfer that extends between the working portion and a toe tip for each of said links of said chain, wherein the leading inside flanks of an adjacent row of said chain project outwardly relative to the chamfer by a projection amount that is greater than said maximum projection amount Lambda (λ) when said inverted tooth chain is pulled straight.

16. The chain and sprocket drive system as set forth in claim 15, wherein said working portion of said trailing outside flank and said chamfer are both flat such that a chamfer angle is defined between said chamfer and a plane of a remainder of said trailing outside flank for each of said inside links.

17. The chain and sprocket drive system as set forth in claim 1, wherein the chain pitch P satisfies the relationship: 6.35 mm≤P≤7.7 mm.

18. The chain and sprocket drive system as set forth in claim 1, wherein σ≤33°.

* * * * *